(12) United States Patent
Shiraishi et al.

(10) Patent No.: US 6,683,921 B1
(45) Date of Patent: Jan. 27, 2004

(54) RECEIVED-SIGNAL ABSOLUTE PHASING APPARATUS OF RECEIVER

(75) Inventors: Kenichi Shiraishi, Yokohama (JP); Akihiro Horii, Zama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/581,509
(22) PCT Filed: Dec. 11, 1998
(86) PCT No.: PCT/JP98/05614
§ 371 (c)(1),
(2), (4) Date: Jun. 16, 2000
(87) PCT Pub. No.: WO99/31850
PCT Pub. Date: Jun. 24, 1999

(30) Foreign Application Priority Data

Dec. 17, 1997 (JP) .............................. 9-364605

(51) Int. Cl.[7] ............................. H03D 3/22; H04L 27/22
(52) U.S. Cl. ....................... 375/331; 375/332; 375/284; 375/371; 329/304
(58) Field of Search ......................... 375/332, 279–281, 375/284, 329, 331, 371; 329/304

(56) References Cited

U.S. PATENT DOCUMENTS

| 5,673,291 A | * | 9/1997 | Dent ........................... 375/262 |
| 6,055,281 A | * | 4/2000 | Hendrickson et al. ....... 375/329 |
| 6,125,148 A | * | 9/2000 | Frodigh et al. ............. 375/261 |

FOREIGN PATENT DOCUMENTS

| JP | 7-297862 | 11/1995 |
| JP | 8-186606 | 7/1996 |
| JP | 9-186730 | 7/1997 |
| JP | 9-321813 | 12/1997 |
| JP | 11-4267 | 1/1999 |
| JP | 11-46224 | 2/1999 |
| JP | 11-55339 | 2/1999 |

* cited by examiner

Primary Examiner—Don N. Vo
Assistant Examiner—Qutbuddin Ghulamali
(74) Attorney, Agent, or Firm—Eric J. Robinson; Robinson Intellectual Property Law Office, P.C.

(57) ABSTRACT

When reception of a multiplexed wave to be PSK-modulated of BPSK, QPSK, and 8PSK is started, a selector (16A) of a demodulating circuit (1A) reads high-order three bits $\Delta\phi(3)$ of phase error data corresponding to I and Q symbol streams out of one phase error table (15-1) for BPSK among phase error tables provided for each modulation system and each phase rotation angle. A received-signal-phase rotation angle detecting circuit (8A) detects phase rotation angles of portions corresponding to bits (1) and (0) of a frame-synchronizing signal of a received symbol stream from the $\Delta\phi(3)$ and the MSB of I symbol stream and outputs the phase rotation angles to a remapper (7) to make the remapper perform absolute phasing. The selector (16A) reads phase error data corresponding to a received symbol stream out of a phase error table corresponding to a modulation system and a phase rotation angle identified by a transmission-configuration identifying circuit (9), outputs the phase error data to a D/A converter (17), corrects a phase of a reference carrier wave for orthogonal detection, and makes a received-signal point become a constant phase for a transmitted-signal point.

2 Claims, 28 Drawing Sheets

| θ | R | R (3) |
|---|---|---|
| 0 | 0 | 0 0 0 |
| π/4 | 1 | 0 0 1 |
| 2π/4 | 2 | 0 1 0 |
| 3π/4 | 3 | 0 1 1 |
| 4π/4 | 4 | 1 0 0 |
| 5π/4 | 5 | 1 0 1 |
| 6π/4 | 6 | 1 1 0 |
| 7π/4 | 7 | 1 1 1 |

FIG. 4A

| INPUT | OUTPUT |
|---|---|
| 0 0 0 | 0 0 0 |
| 0 0 1 | 0 0 1 |
| 0 1 0 | 0 1 1 |
| 0 1 1 | 0 1 0 |
| 1 0 0 | 1 1 0 |
| 1 0 1 | 1 1 1 |
| 1 1 0 | 1 0 1 |
| 1 1 1 | 1 0 0 |

FIG. 4B

| INPUT | OUTPUT |
|---|---|
| 0 0 0 | 0 0 0 |
| 0 0 1 | 0 0 1 |
| 0 1 1 | 0 1 0 |
| 0 1 0 | 0 1 1 |
| 1 1 0 | 1 0 0 |
| 1 1 1 | 1 0 1 |
| 1 0 1 | 1 1 0 |
| 1 0 0 | 1 1 1 |

FIG. 6

| INPUT (q(1), i(1)) | OUTPUT |
|---|---|
| 0 0 | 0 0 |
| 0 1 | 0 1 |
| 1 1 | 1 0 |
| 1 0 | 1 1 |

BPSK JUDGING BORDELINE

BPSK JUDGING BORDELINE

RECEIVED-SIGNAL ABSOLUTE PHASING APPARATUS OF RECEIVER

TECHNICAL FIELD

The present invention relates to an received-signal absolute phasing apparatus of receiver, particularly to a received-signal absolute phasing apparatus of receiver, which makes the following coincide with the transmission side: signal point arrangements of received I and Q base-band signals of two series obtained by receiving and demodulating: a signal to be PSK-modulated in which at least an 8PSK-modulated digital signal among 8PSK-modulated digital signal, QPSK-modulated digital signal, and BPSK-modulated digital signal are time-multiplexed with a BPSK-modulated frame synchronizing signal, by a hierarchical transmission system; or a signal to be PSK-modulated in which at least 8PSK-modulated digital signal and QPSK-modulated digital signal among 8PSK-modulated digital signal, QPSK-modulated digital signal, and BPSK-modulated digital signal are time-multiplexed with a BPSK-modulated frame synchronizing signal, by the system.

BACKGROUND ART

Practical use of digital satellite TV broadcasting is advanced which uses a plurality of modulation systems different from each other in required C/N such as a hierarchical transmission system for repeatedly transmitting a wave to be 8PSK-modulated, a wave to be QPSK-modulated, and a wave to be BPSK-modulated by time-multiplexing the waves.

FIG. 11A is an illustration showing a frame configuration of a hierarchical transmission system. One frame is configured by a frame synchronizing signal pattern comprising 32 BPSK-modulated symbols (among 32 symbols, 20 latter-half symbols are actually used as a frame synchronizing signal), a TMCC (Transmission and Multiplexing Configuration Control) pattern for identifying a transmission multiplexing configuration comprising 128 BPSK-modulated symbols, a super-frame-identifying signal pattern comprising 32 symbols (among 32 symbols, 20 latter-half symbols are actually used as a super-frame-identifying signal), main signal of 203 8PSK(trellis-CODEC-8PSK)-modulated symbols, burst symbol signal (BS) of 4 symbols obtained by BPSK-modulating a pseudo random-noise (PN) signal, main signal of 203 8PSK(trellis-CODEC-8PSK)-modulated symbols, burst symbol signal (BS) of 4 symbols obtained by BPSK-modulating a pseudo random-noise (PN) signal, . . . , main signal of 203 QPSK-modulated symbols, burst symbol signal (BS) of 4 symbols obtained by BPSK-modulating a pseudo random-noise (PN) signal, main signal of 203 QPSK-modulated symbols, and burst symbol signal (BS) of 4 BPSK-modulated symbols in order.

In case of a receiver for receiving digital waves to be modulated (waves to be PSK-modulated) according to the hierarchical transmission system, an intermediate-frequency signal of a received signal received by a receiving circuit is demodulated by a demodulating circuit and I and Q base-band signals of two series showing instantaneous values of I axis and Q axis orthogonal to each other every symbol (hereafter, I and Q base-band signals are also referred to as I and Q symbol stream data values) are obtained. By acquiring a frame synchronizing signal from the demodulated I an Q base-band signals, obtaining a present received-signal-phase rotation angle from the signal point arrangement of the acquired frame synchronizing signal, and antiphase-rotating the demodulated I and Q base-band signals in accordance with the obtained received-signal-phase rotation angle, absolute phase generation for adjusting the I and Q base-band signals to a transmission-signal phase angle is performed by an absolute-angle-generating circuit.

As shown in FIG. 12, an absolute-phase generating circuit of a receiver for receiving waves to be PSK-modulated according to a conventional hierarchical transmission system is configured by a frame sync detecting/regenerating circuit 2 serving as frame sync acquiring means provided for the output side of a demodulating circuit 1 to acquire a frame synchronizing signal, a remapper 7 serving as antiphase rotating means comprising a ROM, and received-signal-phase rotation angle detecting circuit 8 serving as received-signal-phase rotation angle detecting means. Symbol 9 denotes a transmission-configuration identifying circuit for identifying a transmission multiplexing configuration shown in FIG. 11A, which outputs a 2-bit-modulating-system identifying signal DM.

The demodulating circuit 1 obtains I and Q base-band signals by quadrature-detecting an intermediate frequency signal IF. In the demodulating circuit 1, symbol 10 denotes a carrier-wave regenerating circuit for regenerating two reference carrier waves $f_{c1}$ (=cos ωt) and $f_{c2}$ (=sin ωt) whose frequencies and phases synchronize with a received carrier wave and which is orthogonal to each other because their phase are shifted by 90° from each other, 60 and 61 denote multipliers for multiplying the intermediate frequency signal IF by $f_{c1}$ and $f_{c2}$, 62 and 63 denote A/D converters for A/D-converting outputs of the multipliers 60 and 61 at a sampling rate two times larger than a symbol rate, 64 and 65 denote digital filters for performing band restriction to outputs of the A/D converters 62 and 63 through digital signal processing, and 66 and 67 denote thinning circuits for thinning outputs of the digital filters 64 and 65 at a ½ sampling rate and outputting I and Q base-band signals (I and Q symbol stream data values) of two series showing instantaneous values of I-axis and Q-axis every symbol. The thinning circuits 66 and 67 transmit I and Q base-band signals I(8) and Q(8) (a numeral in parentheses shows the number of quantization bits and is hereafter also simply referred to as I and Q by omitting the number of quantization bits) having 8 quantization bits (two's complement system).

Mapping for each modulation system at the transmission side will be described below by referring to FIGS. 13A–13C. FIG.13A shows signal point arrangements on an I-Q phase plane (also referred to as I-Q vector plane or I-Q signal space diagram) using 8PSK for a modulation system. The 8PSK modulation system makes it possible to transmit a 3-bit digital signal (abc) by one symbol. Combination of bits configuring one symbol includes eight ways such as (000), (001), (010), (011), (100), (101), (110), and (111). These 3-bit digital signals are converted into signal point arrangements "0" to "7" on the transmission-side I-Q phase plane in FIG. 13A and this conversion is referred to as 8PSK mapping.

In case of the example shown in FIG. 13A, the bit string (000) is converted into a signal point arrangement "0", the bit string (001) into a signal point arrangement "1", the bit string (011) into a signal point arrangement "2", the bit string (010) into a signal point arrangement "3", the bit string (100) into a signal point arrangement "4", the bit string (101) into a signal point arrangement "5", the bit string (111) into a signal point arrangement "6", and the bit string (110) into a signal point arrangement "7".

FIG. 13B shows signal point arrangements on an I-Q phase plane at the time of using QPSK for a modulation system. The QPSK modulation system makes it possible to transmit a 2-bit digital signal (de) by one symbol. Combination of bits configuring the symbol includes four ways such as (00), (01), (10), and (11). In case of the example in FIG. 13B, the bit string (00) is converted into a signal point arrangement "1", the bit string (01) into a signal point arrangement "3", the bit string (11) into a signal point arrangement "5", and the bit string (10) into a signal point arrangement "7".

FIG. 13C shows signal point arrangements at the time of using BPSK for a modulation system. The BPSK modulation system transmits a 1-bit signal (f) by one symbol. In case of the digital signal (f), bit (0) is converted into a signal point arrangement "0" and bit (1) is converted into a signal point arrangement "4". Relations between signal point arrangements and arrangement numbers of modulation systems are the same each other on the basis of 8BPSK.

I axis and Q axis of QPSK and BPSK in the hierarchical transmission system coincide with I axis and Q axis of 8PSK.

When the phase of a received carrier wave coincides with the phase of the reference carrier wave $f_{c1}$ or $f_{c2}$ regenerated by the carrier-wave regenerating circuit 10, the phase of the received-signal point on the I-Q phase plane according to I and Q base-band signals I(8) and Q(8) at the reception side at the time of receiving digital signals corresponding to signal point arrangements "0" to "7" on the I-Q phase plane at the transmission side coincide with those of the transmission side. Therefore, by directly using the relations between signal point arrangements and digital signals at the transmission side (refer to FIGS. 13A–13C), it is possible to correctly identify a digital signal received from a signal point arrangement of a received-signal point.

In fact, however, the reference carrier wave $f_{c1}$ or $f_{c2}$ can take various phase states for a received carrier wave. Therefore, a received-signal point at the reception side is located at a phase position rotated by a certain angle θ from the transmission side. Moreover, when a phase of a received carrier wave fluctuates, θ also fluctuates. When the phase of the received signal point rotates from the transmission side at random, it becomes impossible to identify a received digital signal. For example, when θ is equal to π/8, the received-signal point of the digital signal (000) of the signal point arrangement "0" in the 8PSK modulation system at the transmission side is located between the signal point arrangements "0" and "1" at the reception side. Therefore, at the time of assuming that the digital signal (000) is received at the signal point arrangement "0", it is judged that the signal (000) is correctly received. However, at the time of assuming that the digital signal (000) is received at the signal point arrangement "1", it is erroneously judged that the digital signal (001) is received. Therefore, for a received-signal point to keep a certain rotation angle from the transmission side, the carrier-wave regenerating circuit 10 corrects phases of the reference carrier waves $f_{c1}$ and $f_{c2}$ so that a digital signal can be correctly identified.

Specifically, by making a VCO (voltage control oscillator) 11 of the carrier-wave regenerating circuit 10 oscillate at a transmission carrier wave frequency, the reference carrier wave $f_{c1}$ is generated and moreover, the reference carrier wave $f_{c2}$ is generated by advancing a phase of an oscillation signal of the VCO 11 by 90° by a 90° phase shifter 12. Then, by changing control voltages of the VCO 11, phases of the reference carrier wave $f_{c1}$ or $f_{c2}$ can be changed.

The carrier-wave regenerating circuit 10 is provided with phase error tables 13, 14-1 and 14-2, and 15-1 to 15-4 respectively configured by a ROM and formed by tabulating relations between various data sets of the I and Q base-band signals I(8) and Q(8) and carrier-wave phase error data having 8 quantization bits (two's complement system) (hereafter also simply referred to as phase error data) Δφ(8) (refer to FIG. 14) by modulation systems of 8PSK, QPSK and BPSK. The I and Q base-band signals I(8) and Q(8) are input to the phase error tables 13, 14-1 and 14-2, and 15-1 to 15-4 in parallel. A phase error table selectively enabled by a selector to be described later outputs the phase error data Δφ(8) corresponding to the I and Q base-band signals I(8) and Q(8) input from the demodulating circuit 1.

The phase error table 13 is used for 8PSK, in which the relation between a phase angle φ (refer to FIG. 15) on the I-Q phase plane of the received-signal point shown by the I and Q base-band signals I(8) and Q(8) input from the demodulating circuit 1 and the phase error data Δφ(8) is configured as shown in FIG. 17. A selector 16 enables only the phase error table 13 (makes only the phase error table 13 active) while the demodulating circuit 1 demodulates digital waves to be modulated in accordance with the BPSK modulation system (specified by a modulation-system identifying signal DM supplied from a transmission-configuration identifying circuit 9 to be described later) in accordance with a clock $CLK_{SYB}$ (refer to FIG. 11B) having a symbol rate synchronous with outputs of the I and Q base-band signals I(8) and Q(8) supplied from the demodulating circuit 1 and reads the phase error data Δφ(8) corresponding to the set data of the I(8) and Q(8) whenever the demodulating circuit 1 outputs the I and Q base-band signals I(8) and Q(8) for one symbol. The phase error data Δφ(8) is converted into a phase error voltage by a D/A converter 17 and thereafter, low-frequency components are fetched from the phase error voltage by an LPF 18 and the voltage is applied to the VCO 11 as a control voltage. When the phase error data Δφ(8) is equal to 0, outputs of the LPF 18 are not changed or phases of the reference carrier wave $f_{c1}$ or $f_{c2}$ are not changed. However, when the phase error data Δφ(8) is positive, outputs of the LPF 18 increase and phases of the reference carrier waves $f_{c1}$ and $f_{c2}$ are delayed. However, when the phase error data Δφ(8) is negative, outputs of the LPF 18 decrease and phases of the reference carrier waves $f_{c1}$ and $f_{c2}$ are advanced.

In the phase error table 13, the difference between φ and the phase of the nearest one of the signal point arrangements "0" to "7" serves as the phase error data Δφ(8). Therefore, positions of digital signals of signal point arrangements of 0, π/4, 2π/4, 3π/4, 4π/4, 5π/4, 6π/4, and 7π/4 according to the 8PSK modulation system at the transmission side are respectively corrected to a position rotated by Θ=m×π/4 (m=one of integers 0 to 7: refer to FIG. 16) on the I-Q phase plane at the reception side. Symbol Θ denotes a received-signal phase rotation angle. Thereby, because received-signal points according to the 8PSK modulation system are brought to positions of phases 0, π/4, 2π/4, 3π/4, 4π/4, 5π/4, 6π/4, and 7π/4, it is possible to assign the signal point arrangements "0" to "7" on the I-Q phase plane at the reception side to the same phases as that of the transmission side (However, the relation between a signal point arrangement and a digital signal is changed in accordance with Θ.). By detecting Θ and antiphase-rotating it by −Θ, it is possible to make the relation between a signal point arrangement and a digital signal same as that of the transmission side (absolute phase generation) and easily identify a received digital signal.

The phase error tables 14-1 and 14-2 are used for QPSK and the relation between phase angle φ and phase error data Δφ(8) on the I-Q phase plane of the received-signal point shown by the I and Q base-band signals I(8) and Q(8) is configured as shown in FIGS. 18 and 19. Under normal reception, the selector 16 enables only the phase error table 14-1 when the received-signal phase rotation angle Θ is equal to 0, 2π/4, 4π/4, or 6π/4 while the demodulating circuit 1 demodulates digital waves to be modulated according to the OPSK modulation system in accordance with a clock $CLK_{SYB}$ having a symbol rate and reads the phase error data Δϕ(8) corresponding to the set data for I and Q base-band signals I(8) and Q(8) for one symbol out of the phase error table 14-1 whenever the demodulating circuit 1 outputs the I and Q base-band signals I(8) and Q(8).

In the phase error table 14-1, the difference between ϕ and the phase of the nearest one of the signal point arrangements "1", "3", "5", and "7" serves as the phase error data Δϕ. Therefore, positions of digital signals of the signal point arrangements "1", "3", "5", and "7" of the phases π/4, 3π/4, 5π/4, and 7π/4 according to the QPSK modulation system at the transmission side are respectively corrected to a position rotated by Θ on the I-Q phase plane at the reception side. When Θ is equal to 0, 2π/4, 4π/4, or 6π/4, a received-signal point according to the QPSK modulation system is brought to a position of π/4, 3π/4, 5π/4, or 7π/4. By detecting Θ and antiphase-rotating it by −Θ, it is possible to make the relation between a signal point arrangement and a digital signal same as that of the transmission side (absolute phase generation) and easily identify a received digital signal.

Moreover, the selector 16 enables only the phase error table 14-2 when Θ is equal to π/4, 3π/4, 5π/4, or 7π/4 while the demodulating circuit 10 demodulates digital waves to be modulated according to the QPSK modulation system and reads the phase error data Δϕ(8) corresponding to the set data of the I and Q base-band signals I(8) and Q(8) for one symbol out of the phase error table 14-2 whenever the demodulating circuit 1 outputs the I and Q base-band signals I(8) and Q(8).

In the phase error table 14-2, the difference between f and the phase of the nearest one of the signal point arrangements "0", "2", "4", and "6" serves as the phase error data Δϕ. Therefore, positions of digital signals of the signal point arrangements "1", "3", "5", and "7" of the phases π/4, 3π/4, 5π/4, and 7π/4 according to the QPSK modulation system at the transmission side are respectively corrected to a position rotated by the above Θ. When Θ is equal to π/4, 3π/4, 5π/4, or 7π/4, a received-signal point according to the QPSK modulation system is brought to the position of the phase Θ, 2π/4, 4π/4, or 6π/4. By detecting Θ and antiphase-rotating it by −Θ, it is possible to obtain the same phase as that of the transmission side (absolute phase generation), make the relation between a signal point arrangement and a digital signal same as that of the transmission side, and easily identify a received digital signal.

The phase error tables 15-1 to 15-4 are used for BPSK and the relation between the phase angle ϕ and the phase error data Δϕ(8) on the I-Q phase plane of the received-signal point shown by the I and Q base-band signals I(8) and Q(8) is configured as shown in FIGS. 20 to 23. Selector 16 enables only the phase error table 14-1 when the received-signal phase rotation angle Θ is equal to 0 or 4π/4 while the demodulating circuit 1 demodulates digital waves to be modulated according to the BPSK modulation system synchronously with a clock $CLK_{SYB}$ having a symbol rate and reads the phase error data Δϕ(8) corresponding to the set data for the I and Q base-band signals I(8) and Q(8) for one symbol out of the phase error table 15-1 whenever the demodulating circuit 1 outputs the base band signals I(8) and Q(8).

In the phase error table 15-1, the difference between ϕ and the phase of the nearest one of the signal point arrangements "0" and "4" serves as the phase error data Δϕ. Therefore, positions of digital signals of the signal point arrangements "0" and "4" of the phases 0 and 4π/4 according to the BPSK modulation system at the transmission side are respectively corrected to a position rotated by the above Θ on the I-Q phase plane at the reception side. When Θ is equal to 0 or 4π/4, a received-signal point according to the BPSK modulation system is brought to the position of the phase 0 or 4π/4.

Moreover, the selector 16 enables only the phase error table 15-2 when Θ is equal to π/4 or 5π/4 while digital waves to be modulated are demodulated in accordance with the BPSK modulation system and reads the phase error data Δϕ(8) corresponding to the set data for the I and Q base-band signals I(8) and Q(8) for one symbol out of the phase error table 15-2 whenever the demodulating circuit 1 outputs the I and Q base-band signals I(8) and Q(8).

In the phase error table 15-2, the difference between ϕ and the phase of the nearest one of the signal point arrangements "1" and "5" serves as the phase error data Δϕ. Therefore, positions of digital signals of the signal point arrangements "0" and "4" of the phases 0 and 4π/4 according to the BPSK modulation system at the transmission side are respectively corrected to a position rotated by the above Θ on the I-Q phase plane at the reception side. When Θ is equal to π/4 or 5π/4, a received-signal point according to the BPSK modulation system is brought to the position of the phase π/4 or 5π/4.

Moreover, the selector 16 enables only the phase error table 15-3 when Θ is equal to 2π/4 or 6π/4 while demodulating digital waves to be modulated in accordance with the BPSK modulation system and reads the phase error data Δϕ(8) corresponding to the set data for the I and Q base-band signals I(8) and Q(8) for one symbol from the phase error table 15-3 whenever the demodulating circuit 1 outputs the I(8) and Q(8).

In the phase error table 15-3, the difference between ϕ and the phase of the nearest one of the signal point arrangements "2" and "6" serves as the phase error data Δϕ. Therefore, positions of digital signals of the signal point arrangements "0" and "4" of the phases 0 and 4π/4 according to the BPSK modulation system at the transmission side are respectively corrected to a position rotated by the above Θ on the I-Q phase plane at the reception side. When Θ is equal to 2π/4 or 6π/4, a received-signal point according to the BPSK modulation system is brought to the position of the phase 2π/4 or 6π/4.

Moreover, the selector 16 enables only the phase error table 15-4 when Θ is equal to 3π/4 or 7π/4 while demodulating digital waves to be modulated according to the BPSK modulation system and reads the phase error data Δϕ(8) corresponding to the set data for the I and Q base-band signals I(8) and Q(8) for one symbol out of the phase error table 15-4 whenever the demodulating circuit 1 outputs the I(8) and Q(8).

In the phase error table 15-4, the difference between ϕ and the phase of the nearest one of the signal point arrangements "3" and "7" serves as the phase error data Δϕ. Therefore, positions of digital signals of the signal point arrangements "0" and "4" of the phases 0 and 4π/4 according to the BPSK modulation system at the transmission side are respectively corrected to a position rotated by the above E) on the I-Q phase plane at the reception side. When Θ is equal to 3π/4 or 7π/4, a received-signal point according to the BPSK modulation system is brought to the position of the phase 3π/4 or 7π/4. Also in the case of BPSK modulation, by detecting Θ and antiphase-rotating it by −Θ, it is possible to obtain the same phase as that of the transmission side (absolute phase generation), make the relation between a signal point arrangement and a digital signal same as that of the transmission side, and easily identify a received digital signal.

As shown in FIG. 24, the frame sync detecting/regenerating circuit 2 is configured by a BPSK demapper 3, sync detecting circuits 40 to 47, a frame synchronizing circuit 5, an OR gate circuit 53, and a frame-synchronizing-signal generator 6. The received-signal-phase rotation angle detecting circuit 8 is configured by delay circuits 81 and 82, a 0°/180° phase rotating circuit 83, averaging circuits 85 and 86, and a received-phase judging circuit 87.

The I and Q base-band signals I(8) and Q(8) output from the demodulating circuit 1 are input to a BPSK demapper section 3 of the frame sync detecting/regenerating circuit 2 in order to acquire, for example, a BPSK-modulated frame synchronizing signal and a BPSK-demapped bit stream B0 is output. The BPSK demapper section 3 is configured by, for example, a ROM.

Then, a frame-synchronizing signal will be described below. In case of the hierarchical transmission system, a frame synchronizing signal is BPS-modulated at a required lowest C/N and transmitted. A frame synchronizing signal configured by 20 bits has a bit stream of (S0S1 . . . S18S19)=(11101100110100101000) which are transmitted in order starting with S0. A bit stream of a frame-synchronizing signal is also referred to as "SYNCPAT". The bit stream is converted into the signal point arrangement "0" or "4" through the BPSK mapping shown in FIG. 13C at the transmission side and a converted symbol stream is transmitted.

To acquire BPSK-modulated and transmitted 20 bits, that is, a frame synchronizing signal of 20 symbols, it is necessary to convert a received symbol into a bit through the BPSK demapping shown in FIG. 25A inversely to the mapping converted at the transmission side. Therefore, as shown in FIG. 25A, a demodulated signal is judged as (0) when the signal is received in the hatched area on the I-Q phase plane at the reception side and the signal is judged as (1) when it is received in the not-hatched area. That is, an output is classified into (0) or (1) depending on the fact that the output is received in which area of two judgment areas divided by a BPSK judging borderline shown by a bold line in FIG. 25A and thereby, it is assumed that BPSK demapping is performed.

The I and Q base-band signals I(8) and Q(8) are input to the BPSK demapper section 3 in order to undergo the BPSK demapping and a bit stream B0 BPSK-demapped in the BPSK demapper section 3 is output. In this specification, a demapper denotes a circuit for performing demapping. The bit stream B0 is input to the sync detecting circuit 40 in which a bit stream of a frame-synchronizing signal is acquired from the bit stream B0.

Then, the sync detecting circuit 40 will be described below by referring to FIG. 26. The sync detecting circuit 40 has 20 D-flip-flops (hereafter referred to as D-F/Fs) D19 to D0 connected in series and a 20-stage shift register is configured by these D-F/Fs D19 to D0. The bit stream B0 is input to the D-F/F D19 and successively shifted up until D-F/F D0 and at the same time, logic inversion is applied to predetermined bits of outputs of the D-F/F D19 to D-F/F D0 and then, the outputs are input to an AND gate 51. In the AND gate 51, when output states (D0D1 . . . D18D19) of the D-F/F D19 to D0 are set to (11101100110100101000), an output SYNA0 of the AND gate 51 becomes a high potential. That is, when a SYNCPAT is acquired, the SYNA0 becomes a high potential.

The output SYNA0 of the sync detecting circuit 40 is input to the frame synchronizing circuit 5 through the OR gate circuit 53. In the frame synchronizing circuit 5, it is judged that frame sync is effectuated when it is confirmed that an output SYA of the OR gate circuit 53 repeatedly becomes a high potential every certain frame cycle and a frame synchronizing pulse is output every frame cycle.

Usually, in case of a hierarchical transmission system to which a plurality of modulation systems having necessary C/Ns different from each other are time-multiplexed and repeatedly transmitted every frame, header data values showing their multiple configurations are multiplexed (TMCC pattern in FIG. 11A). The transmission-configuration identifying circuit 9 extracts TMCC showing a multiple configuration from a bit stream after BPSK demapper input from the frame synchronizing circuit 5 after it is judged by the frame sync detecting/regenerating circuit 2 that frame sync is effectuated, decodes the TMCC, and outputs a modulation-system identifying signal DM showing by which modulation system the present I and Q base-band signals I and Q are generated to the selector 16 (refer to FIG. 11B). Moreover, the received-signal phase rotation angle detecting circuit 8 detects a received-signal phase rotation angle Θ in accordance with a regenerated-frame synchronizing signal output from the frame-synchronizing-signal generator 6 after it is judged by the frame sync detecting/regenerating circuit 2 that frame sync is effectuated and outputs a 3-bit received-signal phase rotation angle signal AR(3) to the remapper 7 and the selector 16 of the carrier wave regenerating circuit 10.

The selector 16 of the carrier wave regenerating circuit 10 reads the phase error data Δφ(8) from a phase error table corresponding to a modulation system and the received-signal phase rotation angle Θ after the modulation system identifying signal DM is input from the transmission configuration identifying circuit 9 and moreover, the received-signal phase rotation angle signal AR(3) is input from the received-signal phase rotation angle detecting circuit 8 and outputs the phase error data Δφ(8) to the D/A converter 17. Until then, however, the selector 16 reads the phase error data Δφ(8) out of the phase error table 13 for 8PSK.

Thus, until the transmission configuration identifying circuit 9 identifies a multiple configuration and the received-signal phase rotation angle detecting circuit 8 detects the received-signal phase rotation angle Θ, the demodulating circuit 1 always operates as an 8PSK demodulating circuit. Therefore, a received-signal point rotates by Θ=m×π/4 (m is one of integers 0 to 7) from the transmission side depending on a phase state of the reference carrier wave $f_{c1}$ or $f_{c2}$ regenerated by the carrier wave regenerating circuit 10 of the demodulating circuit 1.

That is, as shown in FIG. 13C, a received-signal point of a symbol stream of a frame synchronizing signal BPSK-mapped to the signal point arrangement "0" for the bit (0) or BPSK-mapped to the signal point arrangement "4" for the bit (1) at the transmission side appears on one of the following cases depending on a phase state of the reference carrier wave $f_{c1}$ or $f_{c2}$: the signal point arrangement "0" or "4" where Θ equals 0 similarly to the case of the transmission side, signal point arrangement "1" or "5" rotated by Θ=π/4 phases, signal point arrangement "2" or "6" rotated by Θ=2π/4 phases, the signal point arrangement "3" or "7" rotated by Θ=3π/4 phases, signal point arrangement "4" or "0" rotated by Θ=4π/4 phases, signal point arrangement "5" or "1" rotated by Θ=5π/4 phases, signal point arrangement "6" or "2" rotated by Θ=6π/4 phases, and signal point arrangement "7" or "3" rotated by Θ=7π/4 phases. Thus, a demodulated frame synchronizing signal has eight phase states. Therefore, even when a frame-synchronizing signal is demodulated in any phase, the signal must be acquired.

Therefore, the BPSK demapper section 3 is configured by BPSK demappers 30 to 37 corresponding to phase rotations of Θ=0 (m=0), Θ=7π/4 (m=1), Θ=2π/4 (m=2), Θ=3π/4 (m=3), Θ=4π/4 (m=4), Θ=5π/4 (m=5), Θ=6π/4 (m=6), and Θ=7π/4 (m=7).

FIG. 25B shows BPSK demapping corresponding to a case in which a symbol stream of a demodulated frame synchronizing signal rotates by Θ=π/4 and the bit (0) appears on the signal point arrangement "1" and the bit (1) appears on the signal point arrangement "5". The BPSK judging borderline shown by the bold line in FIG. 25B rotates by π/4 counterclockwise from the BPSK judging borderline of the BPSK demapping shown by the bold line in FIG. 25A at the time of reception at the same phase as that of transmission side. By using the BPSK demapper (refer to symbol 31 in FIG. 27) for performing the BPSK demapping shown in FIG. 25B, it is possible to stably acquire a frame synchronizing signal whose phase is rotated by Θ=π/4. A bit stream BPSK-demapped by the BPSK demapper 31 serves as an output B1 of the BPSK demapper section 3 in FIG. 24.

Similarly, the BPSK demappers 32 to 37 perform BPSK demapping at BPSK judging borderlines rotated by 2π/4, 3π/4, . . . , and 7π/4 counterclockwise from the BPSK judging borderline for BPSK demapping shown by the bold line in FIG. 25A to stably acquire frame synchronizing signals phase-rotated by Θ=2π/4, 3π/4, . . . , and 7π/4. Bit streams BPSK-demapped by the BPSK demappers 32 to 37 serve as outputs B2 to B7 of the BPSK demapper section 3 in FIG. 24. The BPSK demapper 30 performs BPSK demapping at the BPSK judging borderline shown by the bold line for BPSK demapping in FIG. 25A to stably acquire a frame synchronizing signal of Θ=0. A bit stream BPSK-demapped by the BPSK demapper 30 serves as an output B0 of the BPSK demapper section 3 in FIG. 24.

Configurations of sync detecting circuits 41 to 47 are the same as the configuration of the sync detecting circuit 40. By using the sync detecting circuits 40 to 47, a frame synchronizing signal is acquired by one of the sync detecting circuits 40 to 47 independently of phase rotation of a base band signal due to a phase state of the reference carrier wave $f_{c1}$ or $f_{c2}$ regenerated by the carrier-wave regenerating circuit 10 of the demodulating circuit 1 and a high-potential SYNAn (n=integer of 0 to 7) is transmitted from a sync detecting circuit acquiring the frame synchronizing signal.

The SYNAn output from the sync detecting circuits 40 to 47 is input to the OR gate circuit 53 and a logical sum SYNA of the SNYAn is output from the OR gate circuit 53. The frame synchronizing circuit 5 judges that frame sync is effectuated when it is confirmed that a high potential of the SYNA is alternately repeatedly input every certain frame interval and outputs a frame synchronizing pulse FSYNC every frame cycle. The frame-synchronizing-signal generator 6 generates a bit stream (referred to as regenerated frame-synchronizing signals) same as a pattern SYNCPAT of frame-synchronizing signals acquired by the BPSK demapper 3, synch detecting circuits 40 to 47, and the frame-synchronizing circuit 5 in accordance with a frame-synchronizing pulse FSYNC output from the frame-synchronizing circuit 5.

The above described is a process until a frame-synchronizing signal is acquired from I and Q symbol stream data I(8) and Q(8) output from the demodulating circuit 1 by the frame-sync detecting/regenerating circuit 2 shown in FIG. 24 and a certain time later, a regenerated frame-synchronizing signal is output from the frame synchronizing-signal generator 6.

Then, a transmission-configuration identifying operation by the transmission-configuration identifying circuit 9 will be described below.

The transmission-configuration identifying circuit 9 receives bit streams B0 to B7 output by the BPSK demapper 3 of the frame-sync detecting/regenerating circuit 2, SYNA0 to SYNA7 output by the sync detecting circuits 40 to 47, and a frame-synchronizing pulse FSYNC output by the frame-synchronizing circuit 5. When the circuit 9 receives the frame-synchronizing pulse FSYNC, it captures a bit stream Bn of a system repeatedly kept at a high potential among SYNA0 to SYNA7, extracts the TMCC pattern in FIG. 11A by using a predetermined timing signal generated in accordance with the frame-synchronizing pulse FSYNC, decodes the pattern, and outputs a modulation-system identifying signal DM showing a modulation system on which the present I and Q base-band signals I and Q depend (refer to FIG. 11B).

Then, absolute-phase generation is described which is realized by obtaining the present received-signal-phase rotation angle from a signal point arrangement of an acquired frame-synchronizing signal and antiphase-rotating demodulated I and Q base-band signals I(8) and Q(8) in accordance with the obtained received-signal-phase rotation angle.

Each symbol of symbol streams of frame-synchronizing signals BPSK-demapped at the transmission side and demodulated into I and Q base-band signals I(8) and Q(8) by the demodulating circuit 1 is demapped to bit (0) or (1) by the BPSK demapper section 3. The phase difference between a symbol demapped to bit (0) and a symbol demapped to bit (1) is equal to 180°. Therefore, by rotating symbols to be demapped to bit (1) of a frame-synchronizing-signal portion of a received symbol stream by 180°, symbol streams to be all demapped to bit (0) are obtained.

Moreover, by obtaining the average value of a plurality of symbols of the symbol stream to be all demapped to bit (0), a received-signal-point arrangement for bit (0) of BPSK is obtained. Therefore, by obtaining the phase difference between an obtained received-signal point for bit (0) of BPSK and a signal point arrangement "0" demapped to bit (0) at the transmission side, assuming the phase difference as a received-signal-phase rotation angle Θ and applying phase rotation of η=−Θ to all I and Q base-band signals, it is possible to generate absolute phases of I and Q base-band signals I(8) and Q(8).

As described above, the frame-synchronizing-signal generator 6 generates a bit stream same as the pattern SYNCPAT of an acquired frame-synchronizing pulse by receiving the frame-synchronizing pulse output from the frame-synchronizing circuit 5 and supplies the bit stream to the 0°/180° phase-rotating circuit 83 of the received-signal-phase rotation angle detecting circuit 8 as a regenerated frame-synchronizing signal. The 0°/180° phase-rotating circuit 83 rotates phases of I and Q base-band signals by 180° when a bit in a bit stream of a supplied regenerated frame-synchronizing signal is bit (1) but the circuit 83 does not rotate the phases in the case of bit (0).

The timing of a bit stream of a regenerated frame-synchronizing signal transmitted from the framesynchronizing-signal generator 6 and that of a symbol stream of a frame-synchronizing signal in I and Q symbol streams are made to coincide with each other by the delay circuits 81 and 82 at the input side of the 0°/180° phase-rotating circuit 83. The delay circuits 81 and 82 open their output gates only while a frame-synchronizing-signal-interval signal is output from the frame-synchronizing-signal generator 6. Therefore, I and Q symbol streams DI(8) and DQ(8) of a frame-synchronizing-signal portion are output from the delay circuits 81 and 82. In case of the I and Q symbol streams DI(8) and DQ(8), a symbol portion corresponding to bit (1) in a bit stream of a regenerated frame-synchronizing signal is phase-rotated by 180° in the 0°/180° phase-rotating circuit 83 but a symbol portion corresponding to bit (0) is transmitted to the averaging circuits 85 and 86 as symbol streams VI(8) and VQ(8) without any phase rotation. The symbol streams VI(8) and VQ(8) serve as symbol streams at the time of receiving a signal BPSK-demapped at the transmission side because it is judged that 20 bits configuring a frame-synchronizing signal are all set to bit (0).

FIG. 28(A) shows a signal point arrangement of I and Q symbol streams I(8) and Q(8) of a frame-synchronizing signal at the time of being received at a received-signal-phase rotation angle of Θ=0 and FIG. 28(B) shows signal point arrangements of I and Q symbol streams VI(8) and VQ(8) after converted by the 0°/180° phase-rotating circuit 83. The I and Q symbol streams VI(8) and VQ(8) are transmitted to the averaging circuits 85 and 86 and, for example, each quantization bit length of the streams is converted into approx. 16 to 18 bits, and thereafter, four frames (16×4=64 symbols) of them are averaged and the average value of the four frames is output as AVI(8) and AVQ(8) according to the quantization bit length of original 8 bits. In this case, I and Q symbol streams VI(8) and VQ(8) are averaged so that a signal point arrangement can be stably obtained even if a slight phase change or amplitude fluctuation of a received base-band signal occurs due to deterioration of a received C/N.

A received-signal point [AVI(8), AVQ(8)] of a signal obtained by BPSK-mapping bit (1) can be obtained by the averaging circuits 85 and 86. Then, the received-signal point [AVI(8), AVQ(8)] is input to the phase judging circuit 87 comprising a ROM, a received-signal-phase rotation angle Θ is obtained in accordance with a received-signal phase-rotation-angle judging table on the AVI-AVQ phase plane shown in FIG. 29, and a three-bit phase-rotation-angle signal AR(3) of three bits (natural binary number) corresponding to Θ is output. "R=0–7" in FIG. 29 denotes a decimal notation of a phase-rotation-angle signal AR(3). For example, "Θ=0" denotes a received-signal-phase rotation angle obtained by judging a signal point Z=[AVI(8), AVQ(8)] shown in FIG. 29 in accordance with a received-signal-phase rotation angle judging table. Therefore, R=0 is obtained and (000) is transmitted as the received-signal-phase rotation angle signal AR(3). When a received-signal-phase rotation angle Θ is equal to π/4, R becomes equal to 1 and (001) is transmitted as the received-signal-phase rotation angle signal AR(3).

Absolute-phase generation is realized when the remapper 7 comprising a ROM receives the received-signal-phase rotation angle signal AR(3) and phase-rotates I and Q base-band signals I(8) and Q(8) in accordance with the received-signal-phase rotation angle signal AR(3).

Then, functions of the remapper 7 will be described below. The remapper 7 configures a phase conversion circuit for making a signal point arrangement of received I and Q base-band signals I(8) and Q(8) same as that of the transmission side. A received-signal-phase rotation angle Θ is calculated by the received-signal-phase rotation angle detecting circuit 8 and the received-signal-phase rotation angle signal AR(3) corresponding to the received-signal-phase rotation angle Θ is supplied to the remapper 7. In this case, the decimal notation R of the received-signal phase-rotation-angle signal AR(3) is an integer of 0 to 7 and the relation with the received-signal-phase rotation angle Θ is defined as shown by the following expression (1).

$$R=\Theta/(\pi/4) \tag{1}$$

Where $$\Theta=m\cdot(\pi/4)$$

m: integer of 0 to 7

Absolute phase generation for I and Q base-band signals can be realized by applying reverse rotation, that is, phase rotation of −Θ to the received-signal-phase rotation angle Θ. Therefore, the remapper 7 rotates phases of input I and Q base-band signals I and Q by an angle η(=−Θ) in accordance with the following expressions (2) and (3) and outputs absolute-phase-generated I and Q base-band signals I'(8) and Q'(8) (hereafter also referred to as I' and Q' by omitting the number of quantization bits).

$$I'=I\cos(\eta)-Q\sin(\eta) \tag{2}$$

$$Q'=I\sin(\eta)+Q\cos(\eta) \tag{3}$$

In case of the above conventional received-signal-phase rotation angle detecting circuit, however, when configuring the 0°/18° phase-rotating circuit 83 through table conversion, the memory capacity requires 128 Kbytes (=$2^{16}$×16 bits). Moreover, when configuring a phase discriminating circuit 86 through table conversion, the memory capacity requires $2^{16}$×3 bits and thereby, a problem occurs that the circuit greatly increases in size.

It is an object of the present invention to provide an apparatus for generating an absolute phase of a signal received by a receiver requiring only a small circuit size.

DISCLOSURE OF THE INVENTION

The apparatus for generating an absolute phase of a signal received by a receiver according to claim 1 of the present invention uses a receiver comprising demodulating means for demodulating a signal to be PSK-modulated in which at least 8PSK-modulated digital signal among 8PSK-modulated digital signal, QPSK-modulated digital signal and a BPSK-modulated digital signal is time-multiplexed with a BPSK-modulated frame-synchronizing signal, by using carrier waves regenerated by carrier-wave regenerating means and outputting I and Q symbol-stream data; frame-synchronizing-signal acquiring means for acquiring a frame-synchronizing signal from the demodulated I and Q symbol-stream data; received-signal-phase rotation angle detecting means for detecting a phase rotation angle of I and Q symbol-stream data output from the demodulating means against the transmission side; and antiphase rotating means for antiphase-rotating a phase of I and Q symbol-stream data output from the demodulating means by a phase rotation angle detected by the received-signal-phase rotation angle detecting means so that the carrier-wave regenerating means of the demodulating means has a phase error table storing carrier-wave phase error data for various demodulated I and Q symbol-stream data sets for each modulation system, reads phase error data corresponding to the demodulated I and Q symbol-stream data from a phase error table of a corresponding modulation system while the demodulating means demodulates a certain modulation-system portion under normal reception, and corrects a phase of a carrier wave; characterized in that the received-signal phase-rotation-angle detecting means includes phase-error data reading means for reading high-order bits for judging whether the absolute value of a phase error is larger or smaller than $(\pi/8)+s\cdot(\pi/4)$ (s is 0 or 1) among phase error data corresponding to the demodulated I and Q symbol-stream data from a phase error table for BPSK modulation of the carrier-wave regenerating means and discriminating means for discriminating a phase rotation angle of a symbol portion corresponding to bit (0) (or bit (1)) of a frame-synchronizing signal against the transmission side in I and Q symbol-stream data output from demodulating means in accordance with the sign bit data of I (or Q) symbol-stream data of a portion corresponding to bit (0) (or bit (1)) of a frame-synchronizing signal acquired by the frame-synchronizing-signal acquiring means in demodulated I and Q symbol-stream data and phase error data read by the phase error data reading means correspondingly to the portion and outputting a discrimination result.

A received-signal-phase rotation angle is univocally determined in accordance with a high-order bit for judging whether the absolute value of a phase error in phase error data according to a phase error table for BPSK modulation corresponding to demodulated I and Q symbol-stream data is larger or smaller than $(\pi/8)+s\cdot(\pi/4)$ (s is 0 or 1) and sign bit data of I (or Q) symbol-stream data of a portion corresponding to bit (0) (or bit (1)) of a frame-synchronizing signal and can be identified through a simple operation. Therefore, it is unnecessary to use a large-scale ROM dedicated for discrimination of a phase rotation angle and thereby, it is possible to decrease a circuit size.

The apparatus for generating an absolute phase of a signal received by a receiver according to claim 2 of the present invention uses a receiver comprising demodulating means for demodulating a signal to be PSK-modulated in which at least 8PSK-modulated digital signal and a QPSK-modulated digital signal among 8PSK-modulated digital signal, QPSK-modulated digital signal, and BPSK-modulated digital signal are time-multiplexed with a BPSK-modulated frame-synchronizing signal, by using carrier waves regenerated by carrier-wave regenerating means and outputting I and Q symbol-stream data; frame-synchronizing-signal acquiring means for acquiring a frame-synchronizing signal from the demodulated I and Q symbol-stream data; received-signal-phase rotation angle detecting means for detecting a phase rotation angle of I and Q symbol-stream data output from the demodulating means against the transmission side; and antiphase rotating means for antiphase-rotating and outputting a phase of I and Q symbol-stream data output from the demodulating means by a phase rotation angle detected by the received-signal-phase rotation angle detecting means so that the carrier-wave regenerating means of the demodulating means has a phase error table storing carrier-wave phase error data for various demodulated I and Q symbol-stream data sets for each modulation system, reads phase error data corresponding to the demodulated I and Q symbol-stream data by referring to a phase error table of a corresponding modulation system while the demodulating means demodulates a certain modulation-system portion under normal reception, and corrects a phase of a carrier wave; characterized in that the received-signal-phase rotation angle detecting means includes phase-error data reading means for reading high-order bits for judging whether the absolute value of a phase error is larger or smaller than $\pi/8$ among phase error data corresponding to the demodulated I and Q symbol-stream data out of a phase error table for QPSK modulation of the carrier-wave regenerating means and discriminating means for discriminating a phase rotation angle of a symbol portion corresponding to bit (0) (or bit (1)) of a frame-synchronizing signal against the transmission side in I and Q symbol-stream data in accordance with the sign bit data of I and Q symbol-stream data of a portion corresponding to bit (0) (or bit (1)) of a frame-synchronizing signal acquired by the frame-synchronizing-signal acquiring means and phase error data read by the phase error data reading means correspondingly to the portion and outputting a discrimination result.

A received-signal-phase rotation angle is univocally determined in accordance with a high-order bit for judging whether the absolute value of a phase error in phase error data according to a phase error table for QPSK modulation corresponding to demodulated I and Q symbol-stream data is larger or smaller than $\pi/8$ and sign bit data of I and Q symbol-stream data of a portion corresponding to bit (0) (or bit (1)) of a frame-synchronizing signal and can be identified through a simple operation. Therefore, it is unnecessary to use a large-scale ROM dedicated to discrimination of a phase rotation angle and thereby, it is possible to decrease a circuit size.

BRIEF DESCRIPTION OF THE DRAWINGS

FIGS. 4A and 4B are illustrations showing relations between binary codes and gray codes;

FIG. 6 is an illustration showing relations between inputs and outputs of a binary converter in FIG. 5;

BEST MODE FOR CARRYING OUT THE INVENTION

Then, a first embodiment of the present invention will be described below by referring to FIG. 1.

Figure 1:
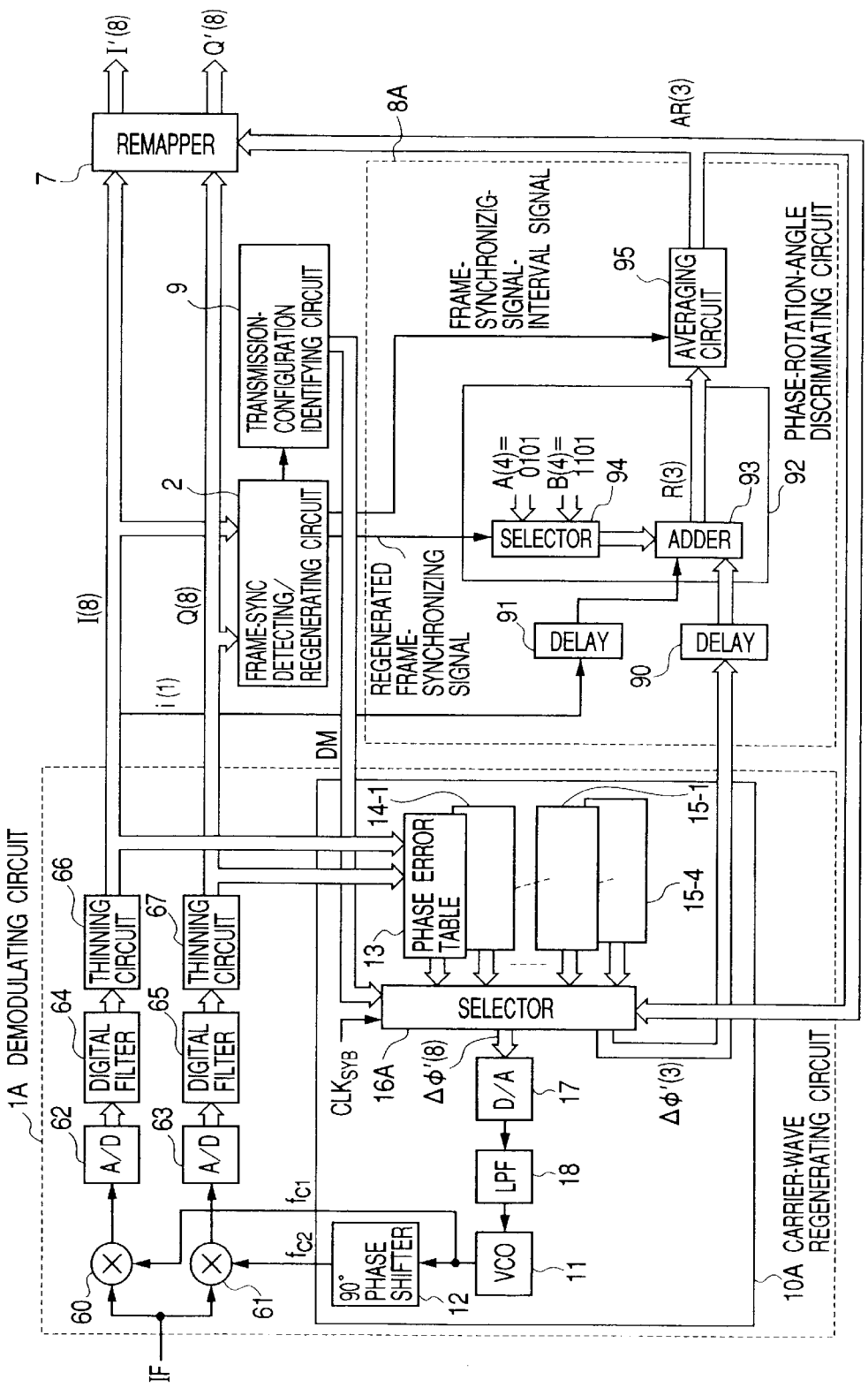
FIG. 1 is a block diagram showing a configuration of an essential portion of a wave to be PSK-modulated receiver of a first embodiment of the present invention.
Figure 12:
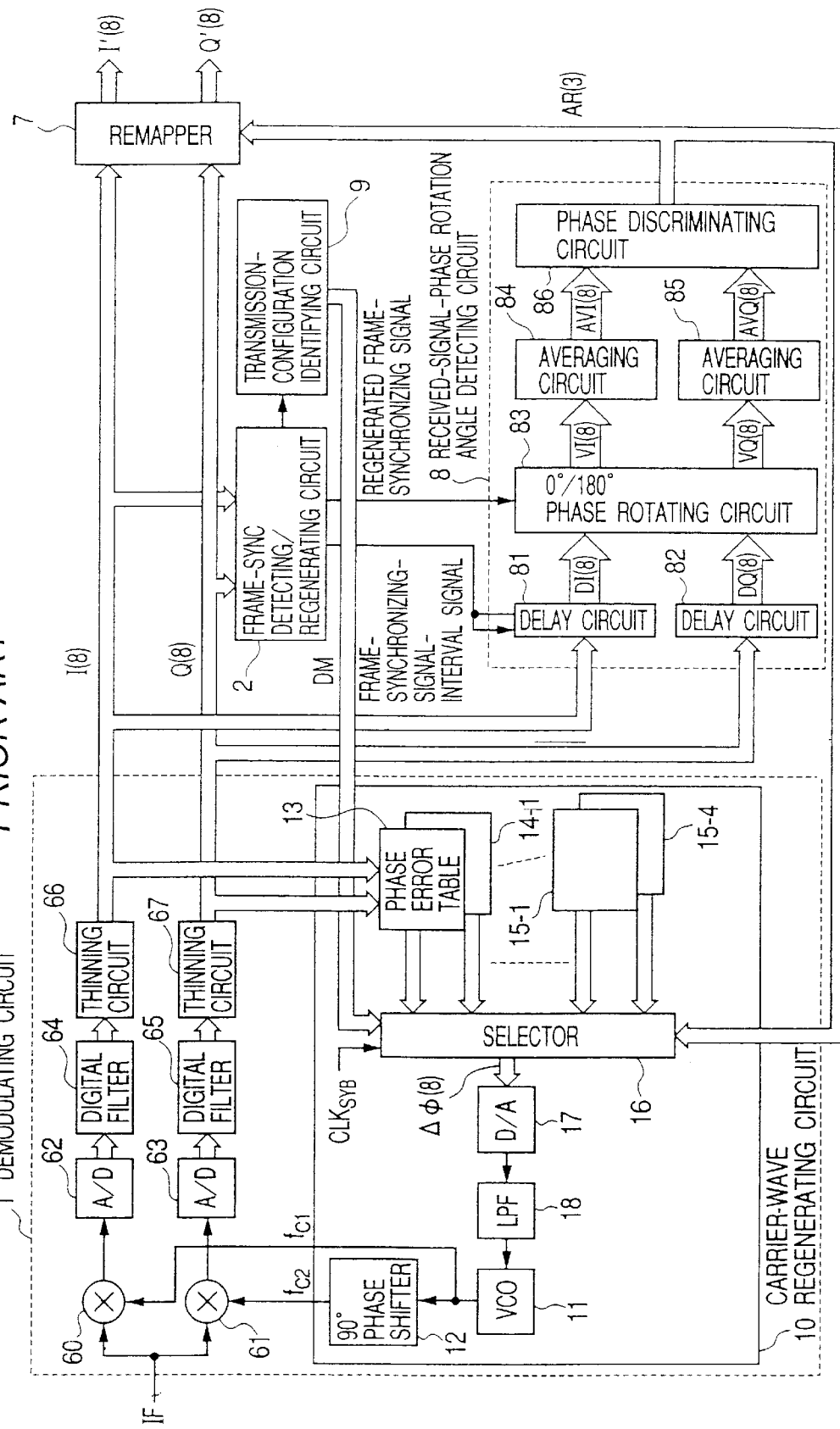
FIG. 12 is a block diagram showing a configuration around a demodulating circuit of a wave to be PSK-modulated receiver according to a conventional hierarchical transmission system.
Figure 13A:
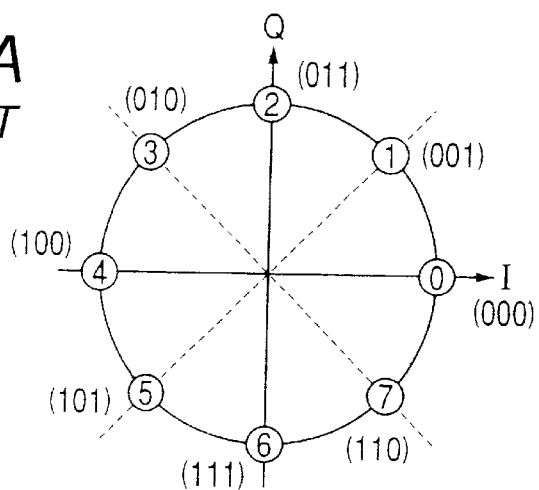
FIGS. 13A to 13C are illustrations showing signal point arrangements for PSK mapping.
Figure 13B:
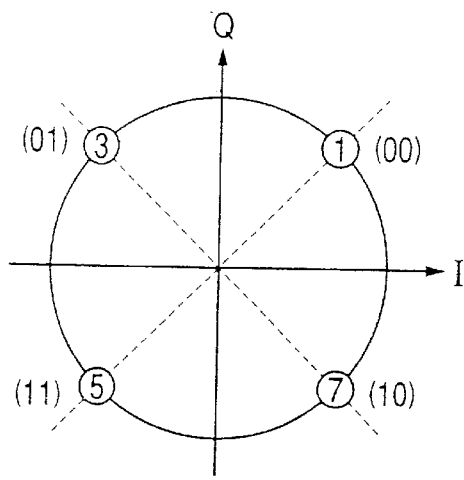
Figure 13C:
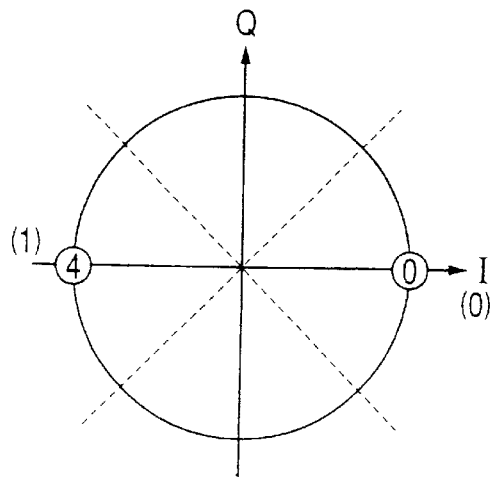
Figure 14:
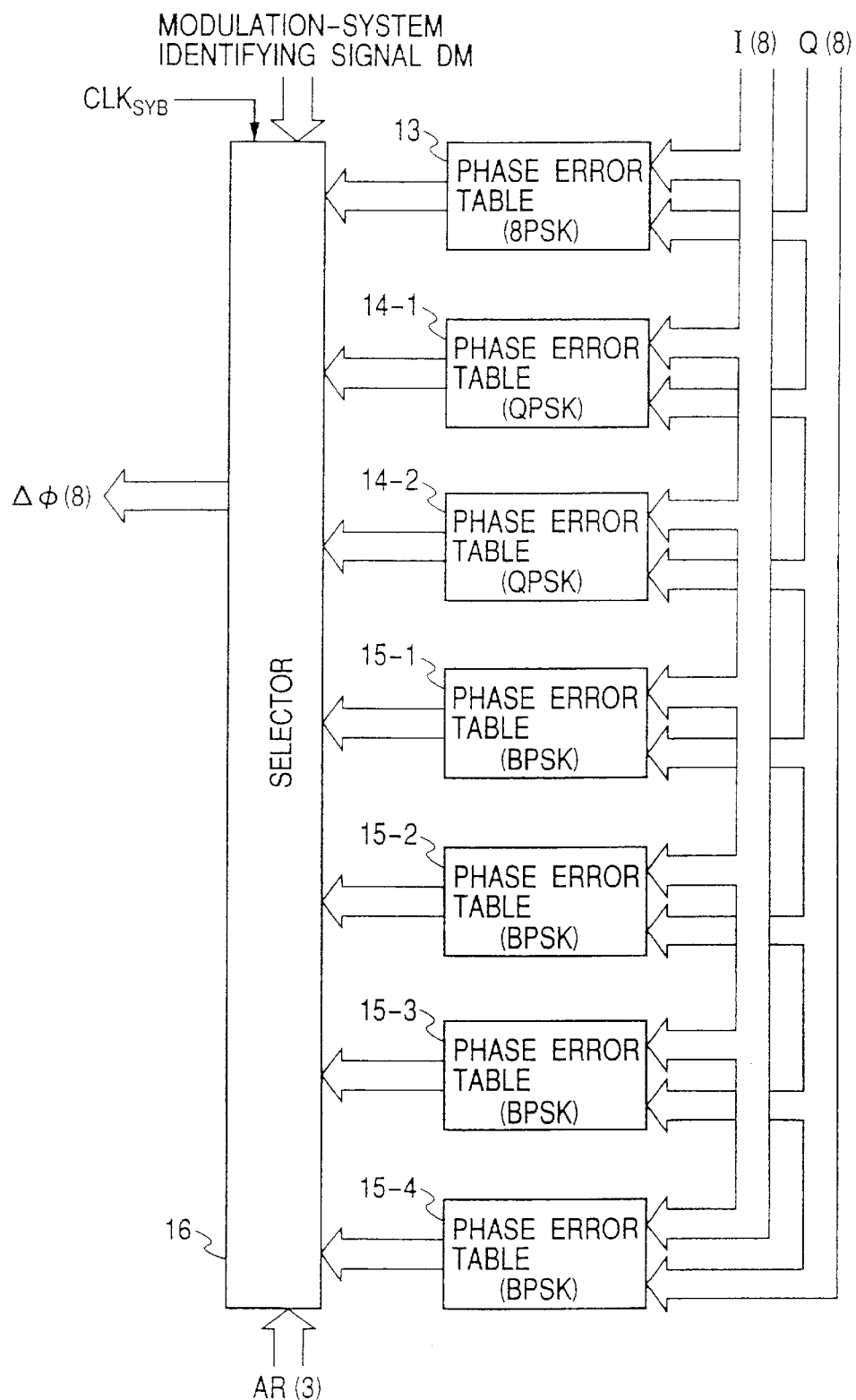
FIG. 14 is a block diagram of a locally-omitted carrier-wave regenerating circuit in FIG. 12.
Figure 15:
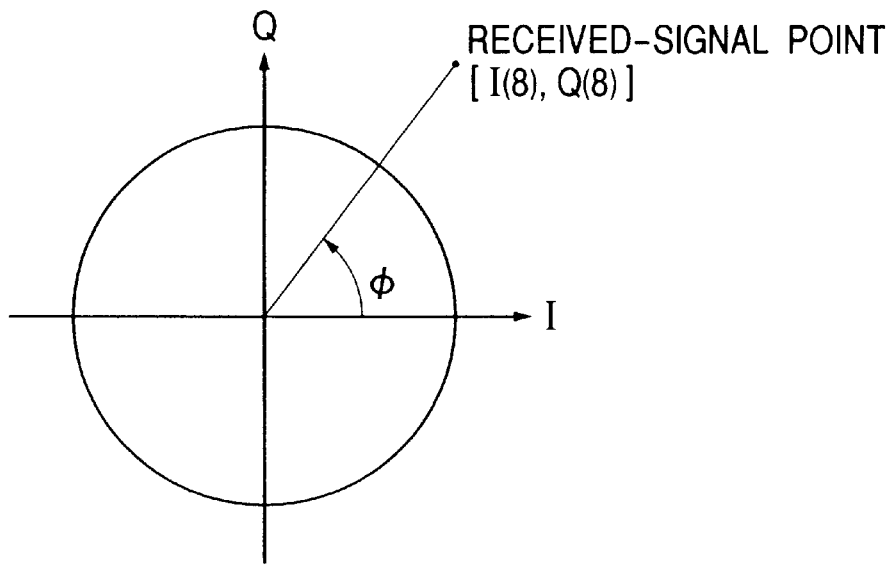
FIG. 15 is an illustration showing how to measure a phase of a received-signal point.
Figure 16:
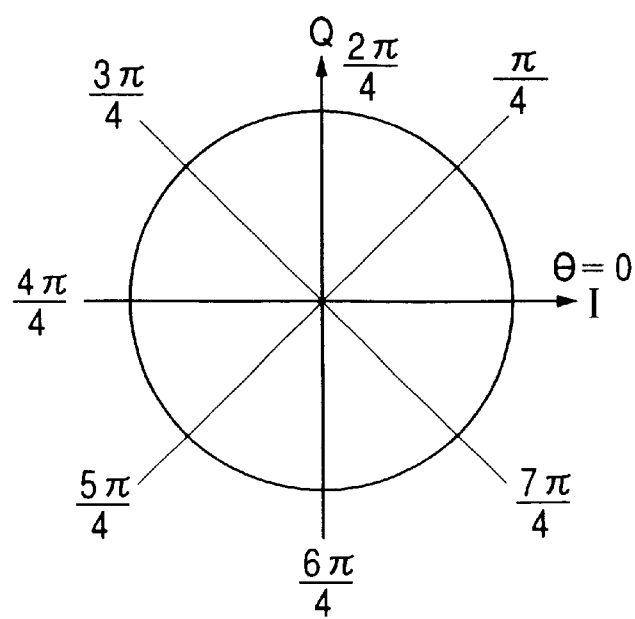
FIG. 16 is an illustration showing how to measure a received-signal-phase rotation angle.

FIG. 1 is a block diagram of an essential portion of a wave to be PSK-modulated receiver of the present invention, in which a component same as that in FIG. 12 is provided with the same symbol.

Figure 11:
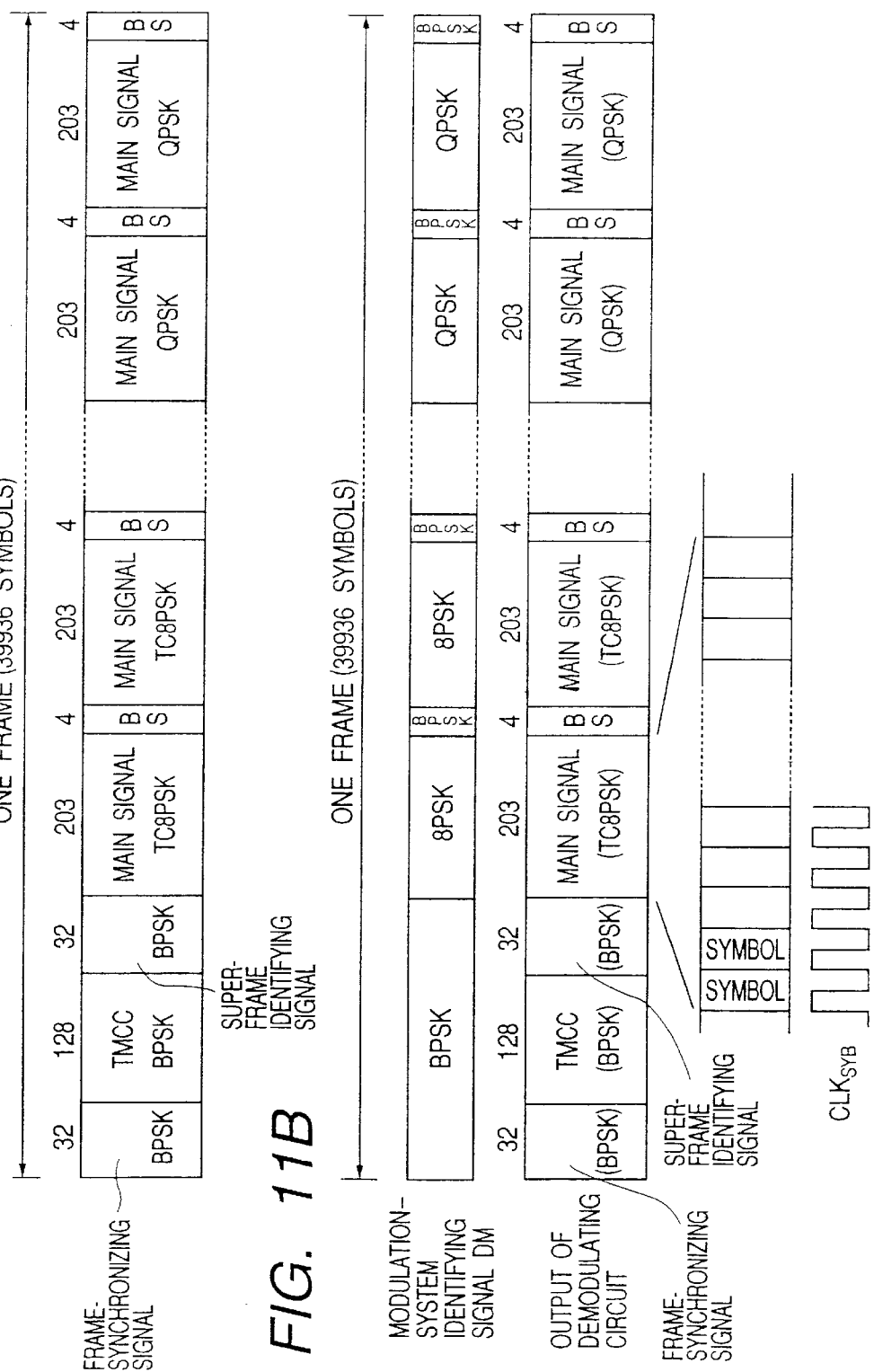
FIGS. 11A and 11B are illustrations showing a frame configuration of a hierarchical transmission system.
Figure 17:
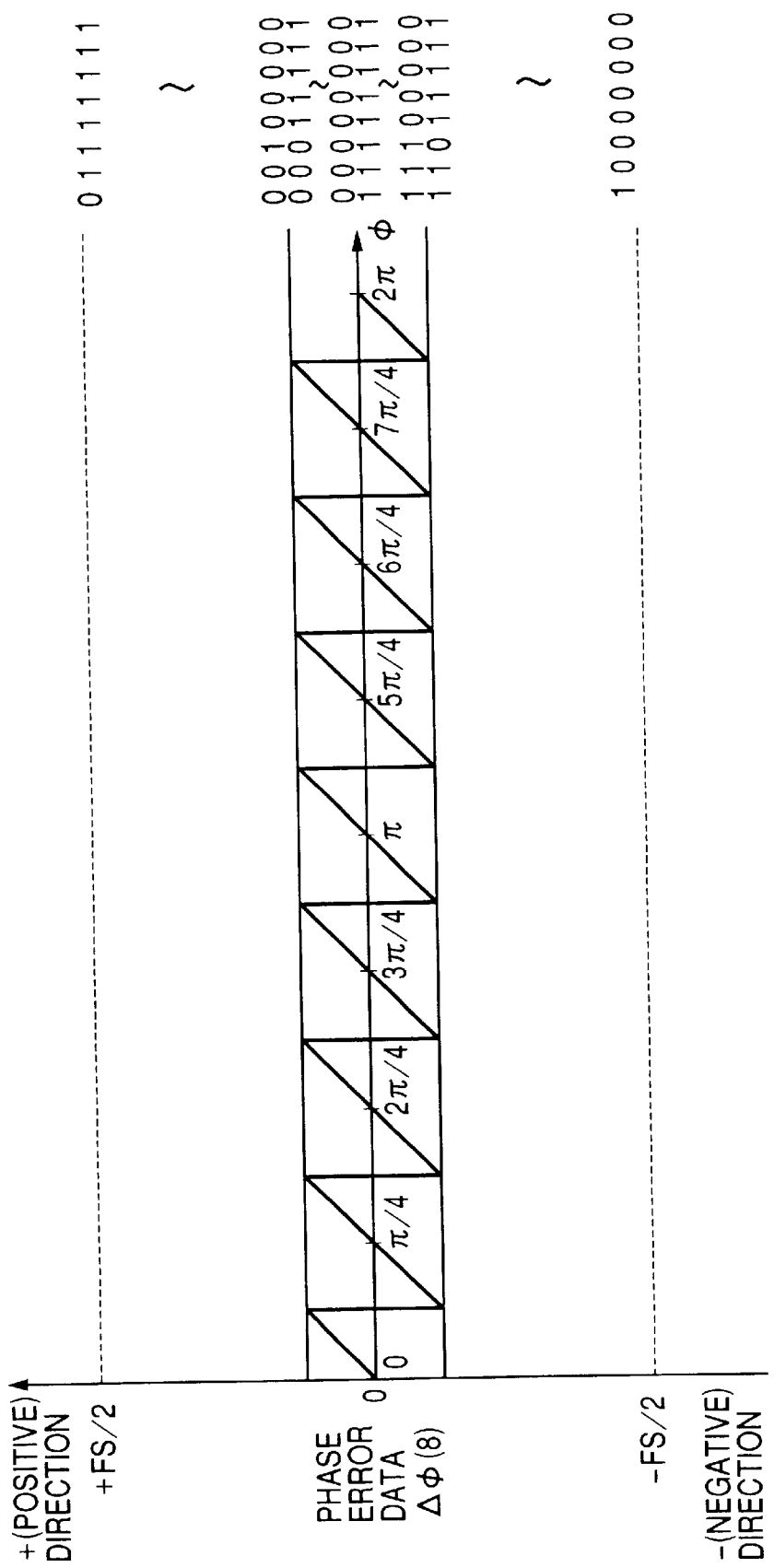
FIG. 17 is an illustration showing a phase error table for 8PSK.

A selector 16A of a carrier-wave regenerating circuit 10A enables only a phase error table 13 for 8PSK (refer to FIG. 17) while a symbol clock $CLK_{SYB}$ is activated (H-level zone of $CLK_{SYB}$; refer to FIG. 11B) before a transmission-configuration identifying circuit 9 identifies a multiple configuration of a frame and a received-signal-phase rotation angle detecting circuit 8A detects a received-signal-phase rotation angle (Θ), reads phase error data Δφ(8) corresponding to I and Q symbol-stream data I(8) and Q(8) output from a demodulating circuit 1A while the symbol clock $CLK_{SYB}$ is activated, and outputs the data Δφ(8) to a D/A converter 17. Moreover, at the same time as the above, the selector 16A enables only a phase error table 15-1 for BPSK (refer to FIG. 20) while the symbol clock $CLK_{SYB}$ is not activated (L-level zone of $CLK_{SYB}$; refer to FIG. 11B), reads high-order three bits (hereafter referred to as phase error data Δφ(3)} in the phase error data Δφ(8) corresponding to I and Q symbol-stream data I(8) and Q(8) output from the demodulating circuit 1A, and outputs the high-order three bits to the received-signal-phase rotation angle detecting circuit 8A while symbol clock $CLK_{SYB}$ is not activated. It is known from the phase error data Δφ(3) whether the absolute value of an phase error is larger or smaller than (π/8)+s·(π/4) (s is 0 or 1).

After the transmission-configuration identifying circuit 9 identifies a multiple configuration of a frame and the received-signal-phase rotation angle detecting circuit 8A detects a received-signal-phase rotation angle (Θ), the selector 16A reads the phase error data Δφ(8) corresponding to I and Q symbol-stream data I(8) and Q(8) out of a modulation system of a received signal demodulated by the demodulating circuit 1A and a phase error table corresponding to the received-signal-phase rotation angle (Θ) while a symbol clock $CLK_{SYB}$ is activated and outputs the data Δφ(8) to the D/A converter 17 and moreover, reads the phase error data Δφ(3) of high-order three bits in the phase error data Δφ(8) corresponding to I and Q symbol-stream data I(8) and Q(8) out of the phase error table 15-1 for BPSK while the symbol clock $CLK_{SYB}$ is not activated.

Symbol 90 denotes a delay circuit for delaying phase error data Δφ(3) read by the selector 16A by a predetermined period and then outputting the data. The delay circuit 90 adjusts timing so that the phase error data Δφ(3) corresponding to the first portion of a frame-synchronizing signal in I symbol-stream data I(8) is output just when the frame-sync detecting/regenerating circuit 2 acquires a frame-synchronizing signal from I and Q symbol-stream data I(8) and Q(8) and starts outputting a regenerated frame-synchronizing signal. Symbol 91 denotes a delay circuit and delays sign-bit data i(1) serving as the MSB of an I symbol stream by a predetermined period and then outputs the data. The delay circuit 91 adjusts timing so that sign-bit data i(1) of the first portion of a frame-synchronizing signal in I symbol stream data I(8) is output just when the frame-sync detecting/regenerating circuit 2 acquires a frame-synchronizing signal from I and Q symbol-stream data I(8) and Q(8) and starts outputting a regenerated frame-synchronizing signal.

Symbol 92 denotes a phase-rotation-angle discriminating circuit, discriminates a phase rotation angle against the transmission side about a symbol portion corresponding to bit (1) of a frame-synchronizing signal in I and Q symbol streams I(8) and Q(8) output from the demodulating circuit 1A in accordance with a portion of an output of delay circuit 91 or 91 corresponding to the frame-synchronizing signal, moreover discriminates a phase rotation angle of a symbol portion corresponding to bit (0) of a frame-synchronizing signal against the transmission side and successively outputs a discrimination result. Symbol 93 in the phase-rotation-angle discriminating circuit 92 denotes a four-bit adder for adding four-bit data (however, carry to fifth bit is not performed), in which an output of the delay circuit 91 is input to the most significant bit of one input side and an output of the delay circuit 90 is input to low-order three bits. A selector 94 is connected to the other input side of the adder 93. The selector 94 inputs a bit stream of a regenerated frame-synchronizing signal output from the frame-sync detecting/regenerating circuit 2, outputs A(4)=(0101) when the portion of bit (0) is input, and outputs B(4)=(1101) when the portion of bit (1) is input. The adder 93 outputs high-order three bits of an addition result as a phase-rotation-angle signal R(3).

Symbol 95 denotes an averaging circuit for averaging a phase-rotation-angle signal R(3). In this case, the averaging circuit 95 averages frame-synchronizing signals for four frames and outputs an averaged signal to the remapper 7 and selector 16A as an phase-rotation-angle signal AR(3). Examples of an averaging circuit 95 will be described later.

Other portions are configured completely the same as those in FIG. 12.

Then, operations of the first embodiment are described below.

(1) Start of Reception

The selector 16A of the carrier-wave regenerating circuit 10A enables only the phase error table 13 for 8PSK while a symbol clock $CLK_{SYB}$ is activated before the transmission-configuration identifying circuit 9 identifies a multiple configuration of a frame and the received-signal-phase rotation angle detecting circuit 8A detects a received-signal-phase rotation angle after start of reception, reads the phase error data Δφ(8) corresponding to I and Q symbol stream data I(8) and Q(8) output from the demodulating circuit 1A while the symbol clock $CLK_{SYB}$ is activated and outputs the data to the D/A converter 17. Moreover, at the same time as the above, the selector 16A enables only the phase error table 15-1 for BPSK while the symbol clock $CLK_{SYB}$ is activated, reads the phase error data Δφ(3) corresponding to I and Q symbol-stream data I(8) and Q(8) output from the demodulating circuit 1A while the symbol clock $CLK_{SYB}$ is not activated, and outputs the data to the delay circuit 90.

When the selector 16A outputs the phase error data Δφ(8) read out of the phase error table 13 for 8PSK to the D/A converter 17, the data is converted into a phase error voltage by the D/A converter 17 and then, low-frequency components are eliminated from the phase error voltage by an LPF 18 and the voltage is applied to a VCO 11 as a control voltage. When the phase error data Δφ(8) is equal to 0, outputs of the LPF 18 are not changed or phases of reference carrier waves $f_{c1}$ and $f_{c2}$ are not changed. However, when the phase error data Δφ(8) is positive, an output of the LPF 18 increases and phases of the reference carrier waves $f_{c1}$ and $f_{c2}$ are delayed. When the phase error data Δφ(8) is negative, an output of the LPF 18 decreases and phases of the reference carrier waves $f_{c1}$ and $f_{c2}$ are advanced. Thereby, phases of the reference carrier waves $f_{c1}$ and $f_{c2}$ are corrected so as to keep a certain relation with a phase of a received carrier wave. As a result, the demodulating circuit 1A corrects digital signals of signal point arrangements "0" to "7" of phases 0, π/4, 2π/4, 3π/4, 4π/4, 5π/4, 6π/4, and 7π/4 to positions rotated by Θ=m×π/4 (m is any one of integers 0 to 7) on I-Q phase plane at the reception side.

Figure 20:
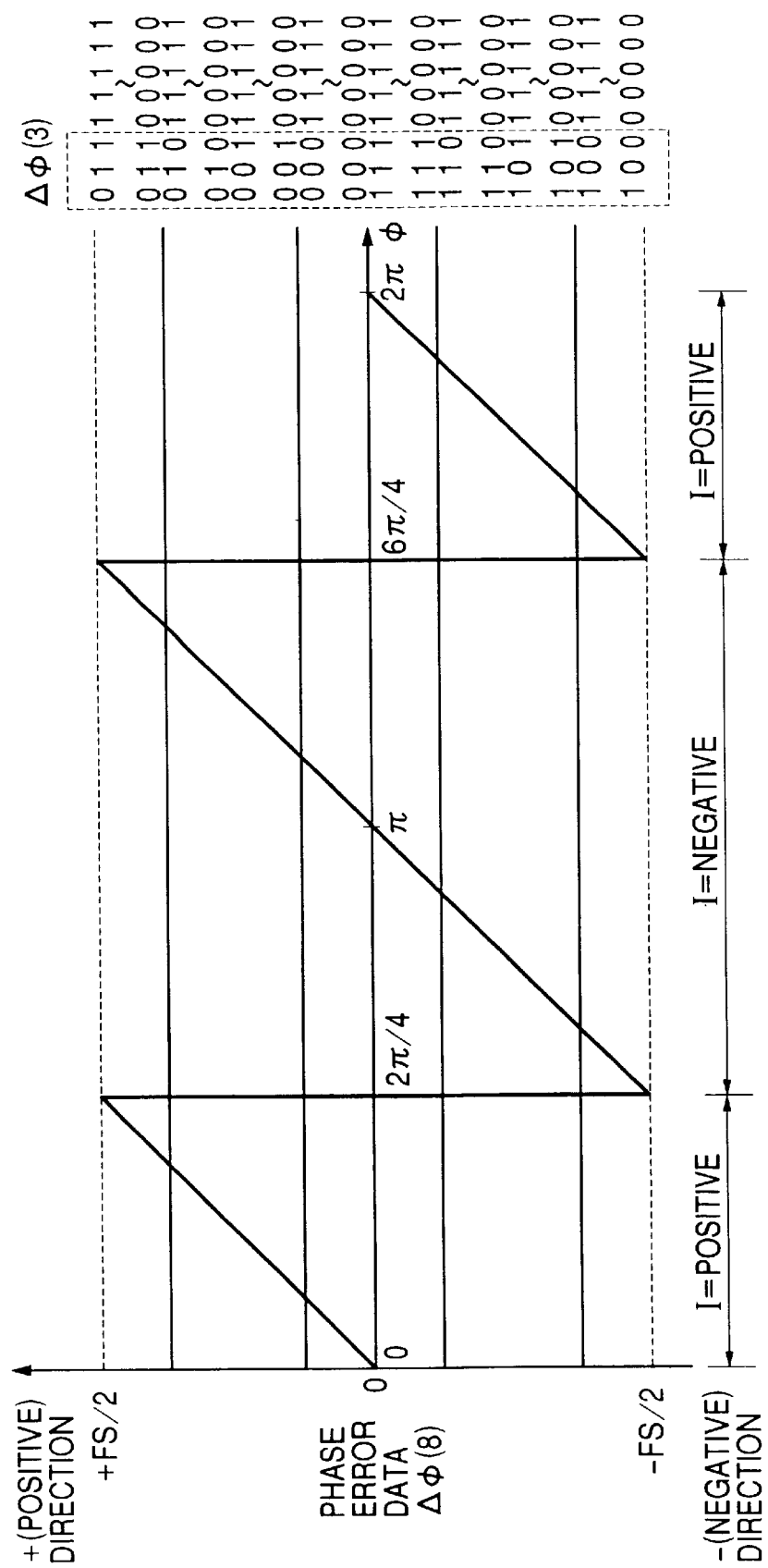
FIG. 20 is an illustration showing a phase error table for BPSK.
Figure 21:
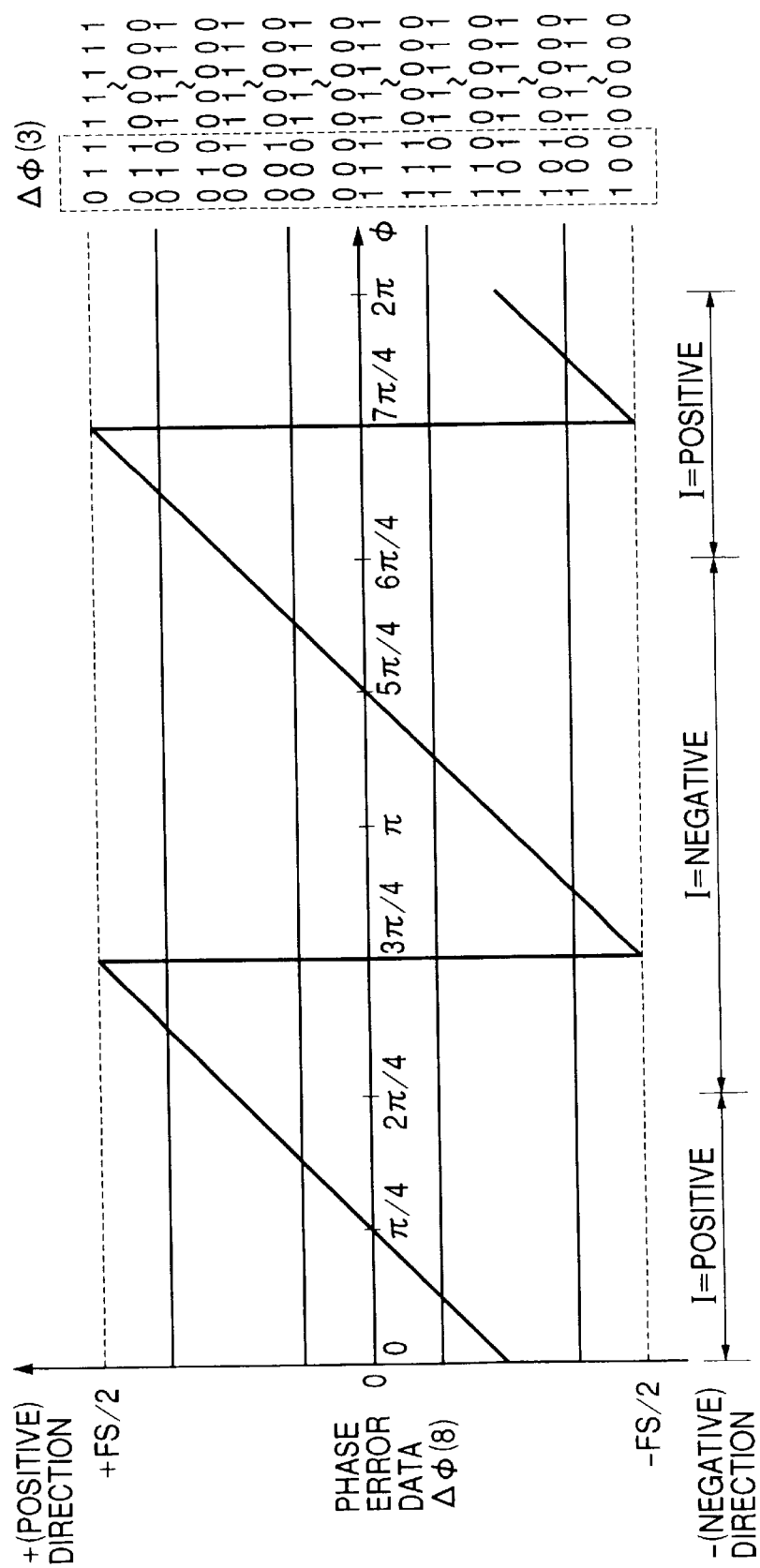
FIG. 21 is an illustration showing a phase error table for BPSK.

Moreover, in the phase error table 15-1, the phase error data Δφ(3) of high-order three bits of the phase error data Δφ(8) corresponding to I and Q symbol-stream data I(8) and Q(8) denote the number of bits for judging whether an absolute value of a phase error is larger or smaller than (π/8)+s·(π/4) (s is 0 or 1) (refer to FIG. 20). By combining the Δφ(3) and the sign bit data i(1) serving as the MSB of I symbol-stream data I(8) and applying a simple operation to the combination of the Δφ(3) and I(8), it is possible to identify to which signal point arrangement a received-signal point corresponds among eight signal-point arrangements "0" to "7". Because a signal point arrangement of the portion of bit (0) (or bit (1)) of a frame-synchronizing signal at the transmission side is determined as "0" (or "4"), a received-signal-phase rotation angle is univocally obtained from the Δφ(3) and the sign bit data serving as the MSB of I symbol-stream data.

When the delay circuits 90 and 91 delay the phase error data Δφ(3) output from the selector 16A and the sign bit data i(1) of I symbol-stream data I(8) fetched from an output of the demodulating circuit 1 and the frame-sync detecting/regenerating circuit 2 acquires a frame-synchronizing signal from I and Q symbol-stream data and starts outputting a regenerated frame-synchronizing signal, the received-signal-phase rotation angle detecting circuit 8A first adjusts timing so that the phase error data Δφ(3) corresponding to the head of the frame-synchronizing-signal portion of I symbol-stream data I(8) is output from the delay circuit 90 and the sign bit data i(1) corresponding to the head of the frame-synchronizing-signal portion of I symbol-stream data I(8) is output from the delay circuit 91. Outputs of the delay circuits 90 and 91 are input to one input side of the adder 93 as a high-order bit and a low-order bit.

When a certain time elapses after start of reception, the frame-sync detecting/regenerating circuit 2 acquires a frame-synchronizing signal in I and Q symbol streams I(8) and Q(8) and outputs a regenerated frame-synchronizing signal. Then, the selector 94 selects A(4)=(0101) at the portion of bit (0) of the regenerated frame-synchronizing signal to output it and selects B(4)=(1101) at the portion of bit (1) to output it. The adder 93 adds one input and the other input at each bit position of the 20-bit regenerated frame-synchronizing signal to output high-order three bits. Then, the adder 93 outputs a received-signal-phase rotation angle signal R(3) obtained by expressing R with a three-bit natural binary number at the time of dividing a received-signal-phase rotation angle Θ into 0, π/4, 2π/4, 3π/4, 4π/4, 5π/4, 6π/4, and 7π/4 and relating them to R=0 to 7 of decimal notation (refer to FIG. 2B).

The averaging circuit 95 captures outputs of the adder 93 while it receives frame-synchronizing-signal-interval signals from the frame-sync detecting/regenerating circuit 2. Then, for example, the circuit 95 averages outputs for four frames and outputs the averaging result to the remapper 7 as a received-signal-phase rotation angle signal AR(3) to make the remapper 7 generate an absolute phase. Moreover, the circuit 95 outputs the received-signal-phase rotation angle AR(3) to the selector 16A. Received-signal-phase rotation angle signals R(3) are averaged in order to stably obtain a received-signal-phase rotation angle even if a slight phase change or amplitude fluctuation occurs in a received base-band signal due to deterioration of a received C/N.

Figure 3:
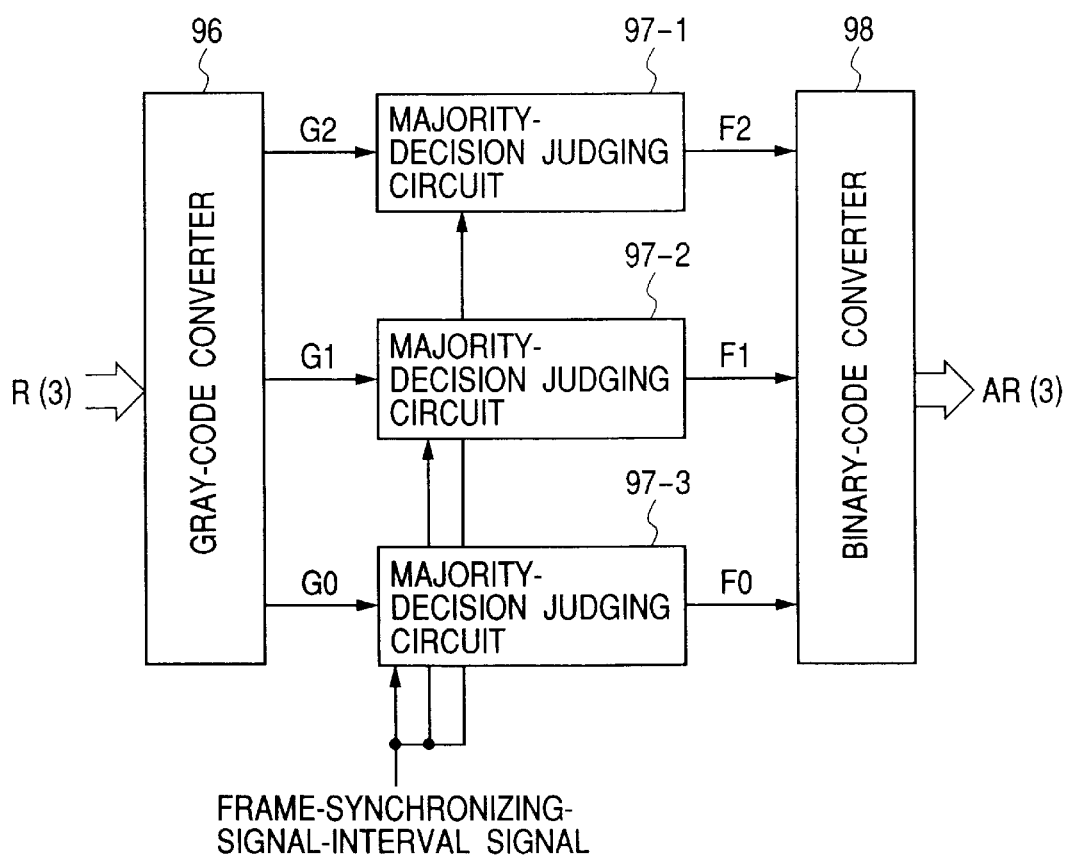
FIG. 3 is a block diagram showing a configuration of an averaging circuit in FIG. 1.

FIG. 3 shows an example of the averaging circuit 95. The received-signal-phase rotation angle signal R(3) output from the adder 93 is converted into a three-bit gray code by a gray code converter 96 in accordance with FIG. 4A. A gray code has a characteristic that only one bit position changes between adjacent codes. Majority-decision judging circuits 97-1 to 97-3 are provided for bit positions G0 to G2 at the output side of the gray code converter 96 to determine which bit is more output from the gray code converter 96, bit (1) or bit (0) while frame-synchronizing-signal-interval signals are input for four frames. Outputs F0 to F2 of the majority-decision judging circuits 97-1 to 97-3 are input to a binary code converter 98 in which conversion reverse to the conversion by the gray code converter 96 is performed in accordance with FIG. 4B. An output of the binary code converter 98 is output as the received-signal-phase rotation angle signal AR(3).

It is also possible to perform majority-decision judgment by omitting the gray code converter 96 and binary code converter 98 and directly inputting outputs of the adder 93 to the majority-decision judging circuits 97-1 to 97-3. However, by performing gray-coding, even if a phase shown by the received-signal-phase rotation angle signal R(3) changes by π/4 code, change always occurs at only one bit position or, even if a slight phase change or amplitude change occurs in a received base-band signal due to deterioration of a received C/N and the received-signal-phase rotation angle signal R(3) erroneously shifts by π/4, it is possible to minimize the influence and thus, the reliability is improved.

(2) Normal Receiving Operation

When the frame-sync detecting/regenerating circuit 2 acquires a frame-synchronizing signal, the transmission-configuration identifying circuit 9 immediately identifies a multiple configuration and outputs a modulation-system identifying signal DM showing to which modulation-system portion the present I and Q symbol streams output from the demodulating circuit 1A correspond to the selector 16A or the like.

The selector 16A receiving the received-signal-phase rotation angle signal AR(3) from the averaging circuit 95 enables only the phase error table 13 while the demodulating circuit 1A demodulates an 8PSK-modulation-system portion and a symbol clock $CLK_{SYB}$ is activated when a received-signal-phase rotation angle Θ shown by the received-signal-phase rotation angle signal AR(3) is equal to, for example, 3π/4 by using the modulation-system identifying signal DM input from the transmission-configuration identifying circuit 9 and reads phase error data Δφ(8) corresponding to I and Q symbol-stream data I(8) and Q(8) output from the demodulating circuit 1A while the symbol clock $CLK_{SYB}$ is activated to output the data Δφ(8) to the D/A converter 17. As a result, phases of the reference carrier waves $f_{c1}$ and $f_{c2}$ are corrected so that digital signals (abc) 8PSK-mapped to transmission-side signal-point arrangements "0", "1", "2", "3", "4", "5", "6", and "7" appear on reception-side signal point arrangements "3," "4", "5", "6", "7", "0", "1", and "2" independently of phase change of the received carrier waves.

Because phases of I and Q symbol-stream data I(8) and Q(8) of the 8PSK-modulation-system portion output from the demodulating circuit 1A are rotated by the remapper 7 by η=-Θ=-3π/4, received-signal points of I and Q symbol-stream data I'(8) and Q'(8) output from the remapper 7 coincide with those of the transmission side.

Figure 19:
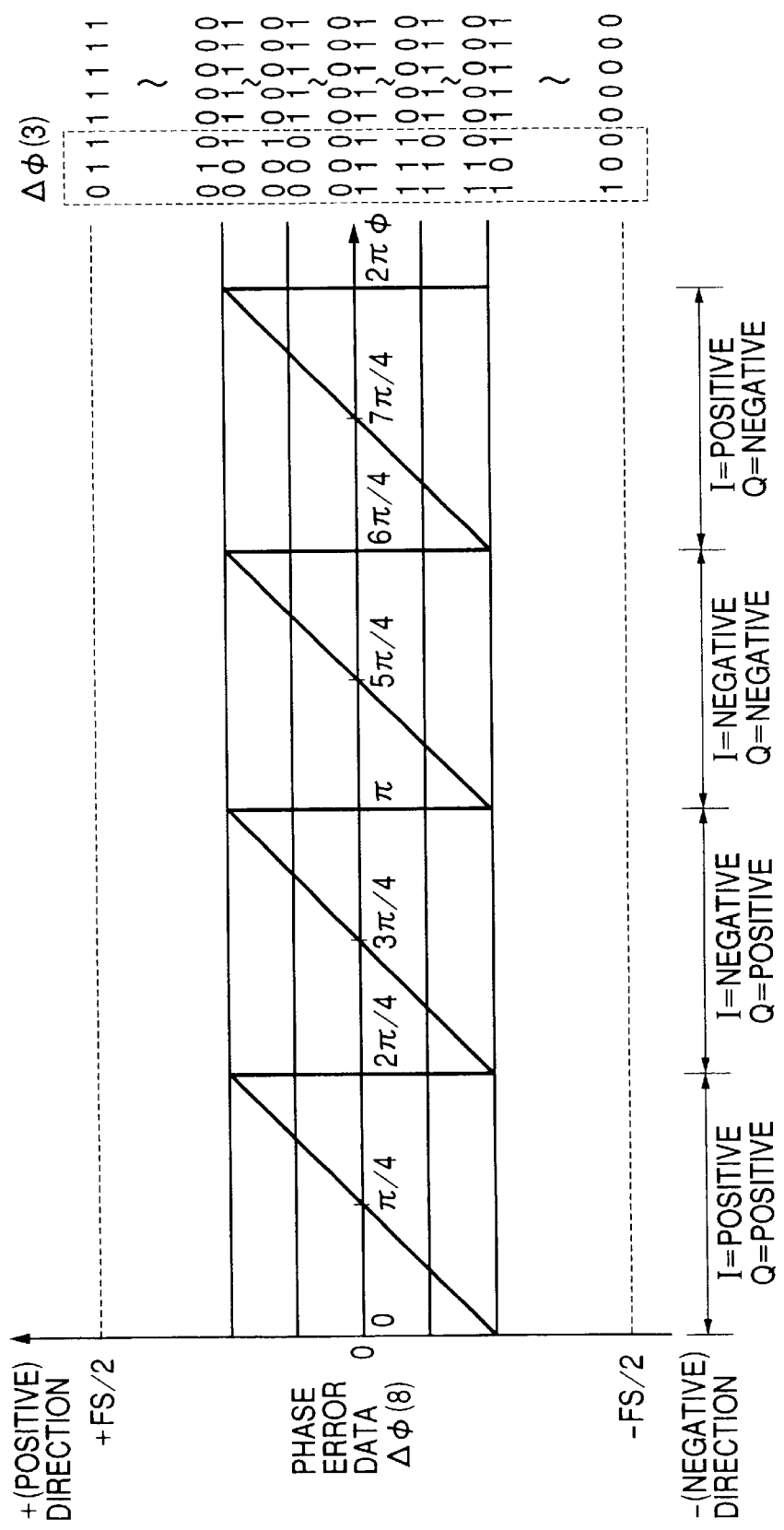
FIG. 19 is an illustration showing a phase error table for QPSK.

When Θ is equal to 3π/4, the selector 16A enables only the phase error table 14-2 while the demodulating circuit 1A demodulates a QPSK-modulation-system portion and a symbol clock $CLK_{SYB}$ is activated and reads from the phase error table 14-2 (refer to FIG. 19) the phase error data Δφ(8) corresponding to I and Q symbol-stream data I(8) and Q(8) output from the demodulating circuit 1A while the symbol clock $CLK_{SYB}$ is activated to output the data Δφ(8) to the D/A converter 17. As a result, phases of the reference carrier waves $f_{c1}$ and $f_{c2}$ are corrected so that digital signals (de) QPSK-mapped to transmission-side signal point arrangements "1", "3", "5", and "7" appear on reception-side signal point arrangements "4", "6", "0", and "2" and therefore, the phases are kept at a phase rotation angle equal to a received-signal-phase rotation angle by 8PSK. Because phases of I and Q symbol-stream data I(8) and Q(8) of the QPSK-modulation-system portion output from the demodulating circuit 1A are also rotated by the remapper 7 by η=-Θ=-3π/4, received-signal points of I and Q symbol-stream data I'(8) and Q'(8) output from the remapper 7 coincide with those of the transmission side.

Figure 22:
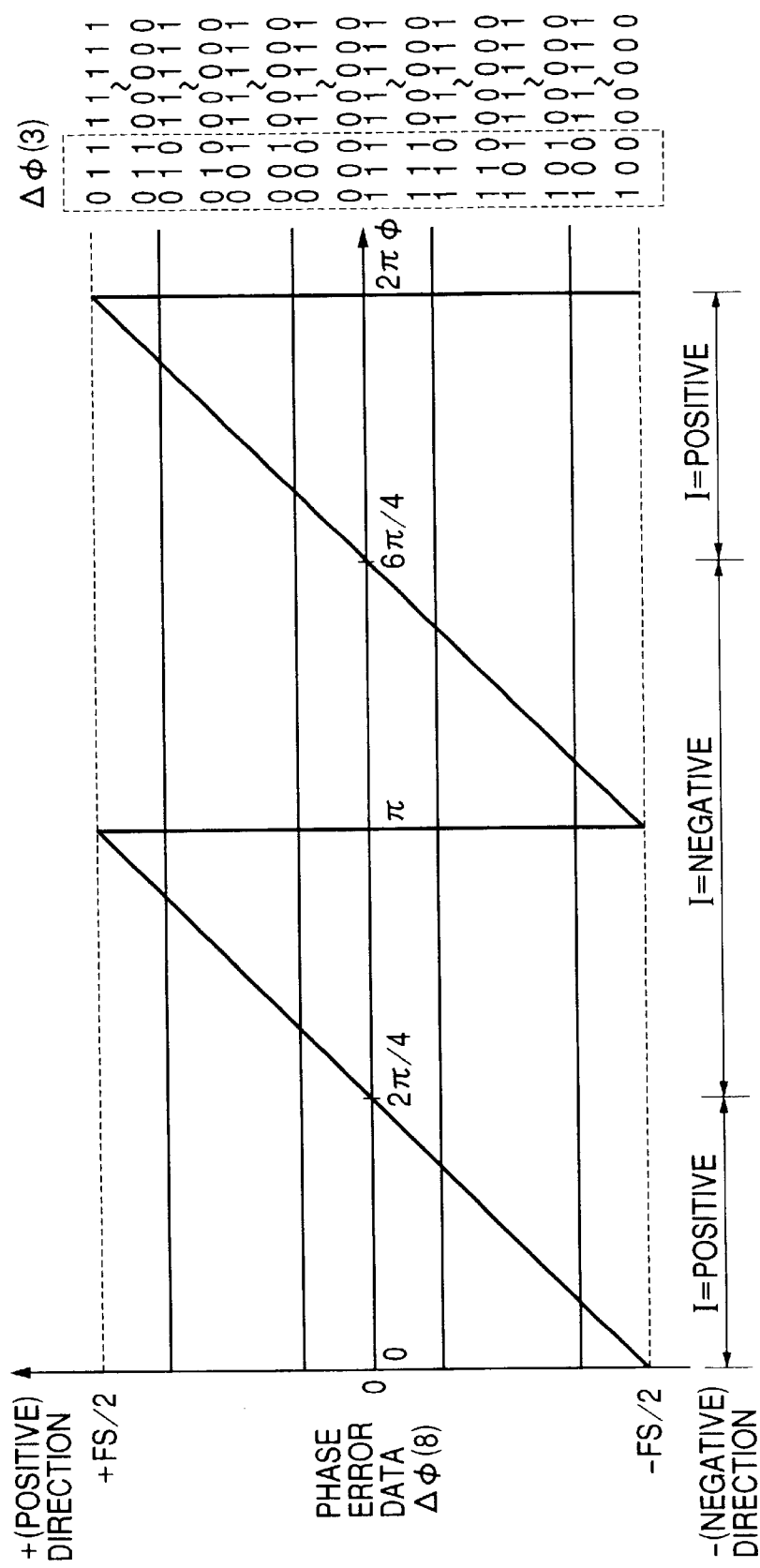
FIG. 22 is an illustration showing a phase error table for BPSK.
Figure 23:
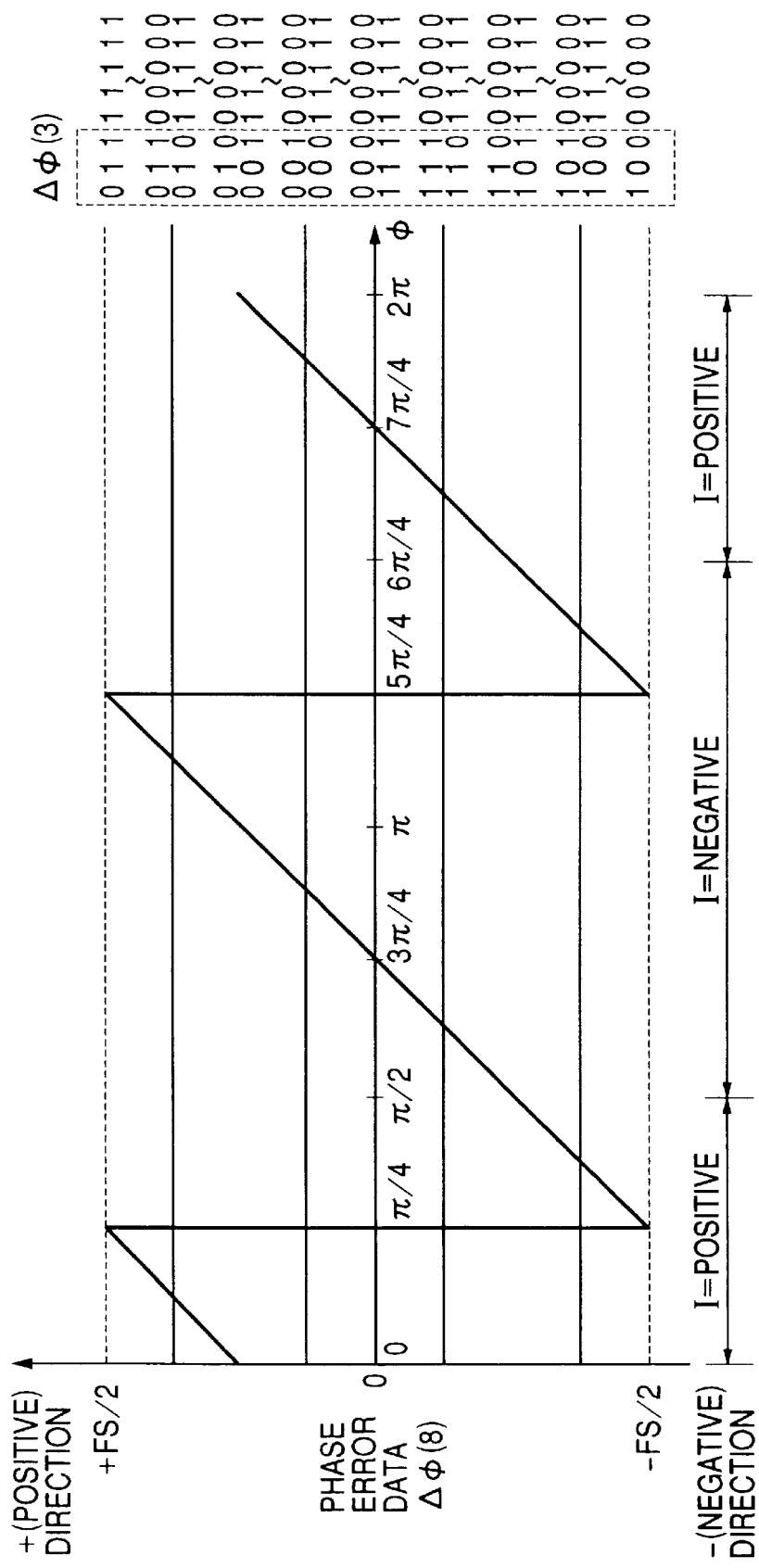
FIG. 23 is an illustration showing a phase error table for BPSK.
Figure 24:
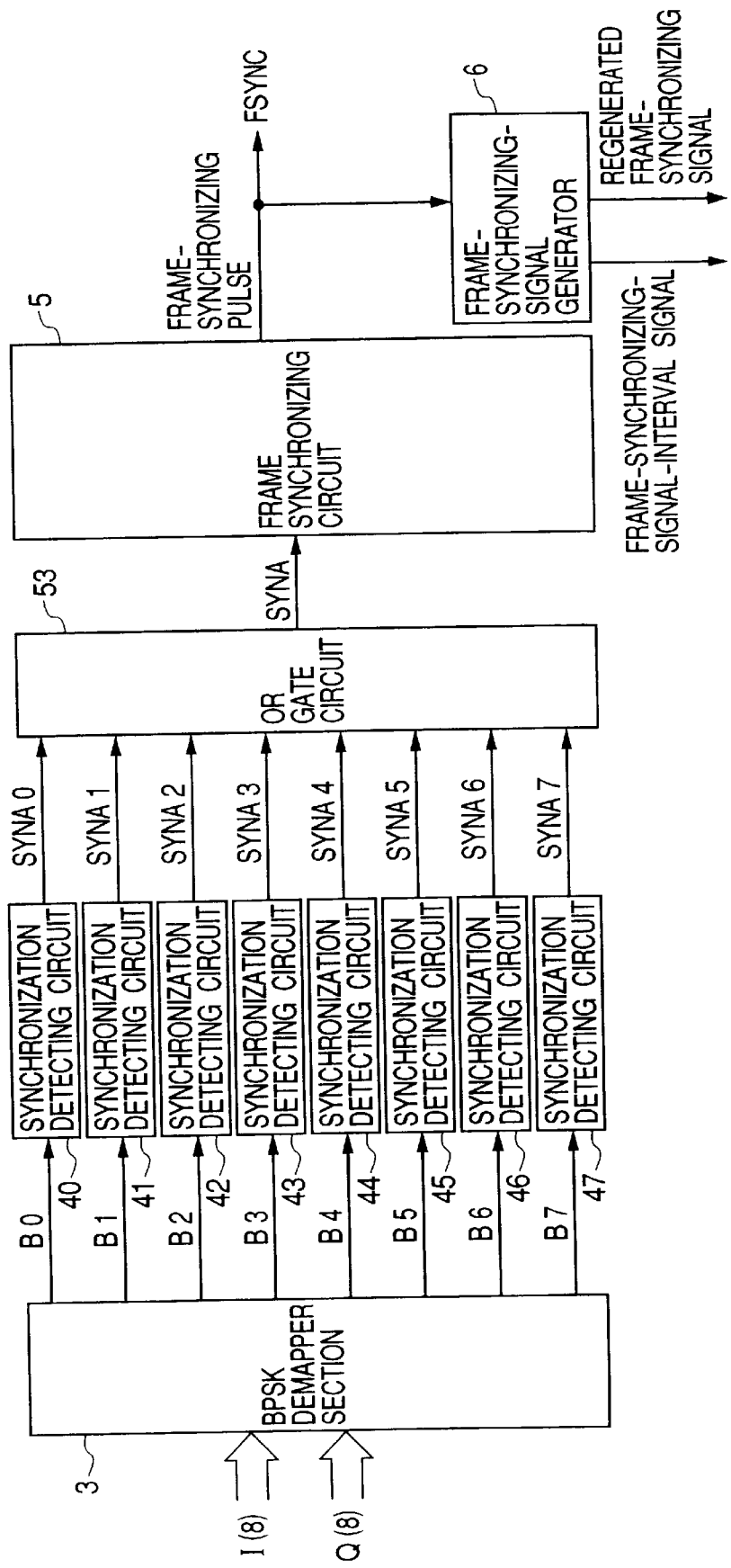
FIG. 24 is a block diagram of a sync detecting/regenerating circuit in FIG. 12.
Figure 25A:
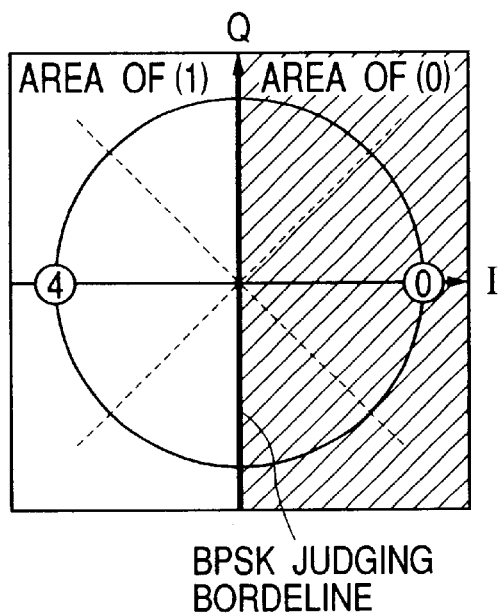
FIGS. 25A and 25B are illustrations for explaining BPSK demapping.
Figure 25B:
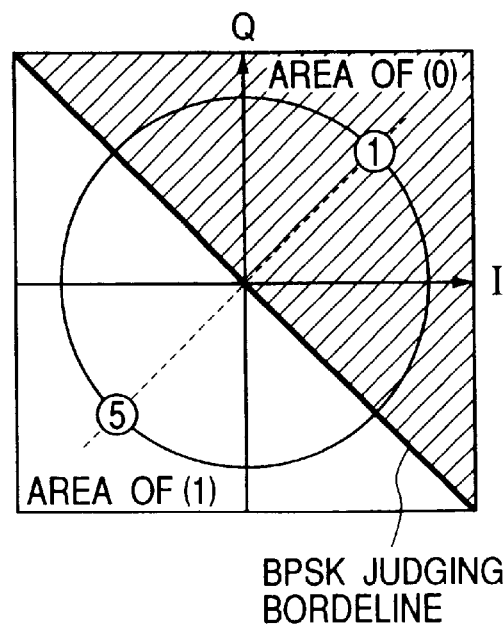
Figure 26:
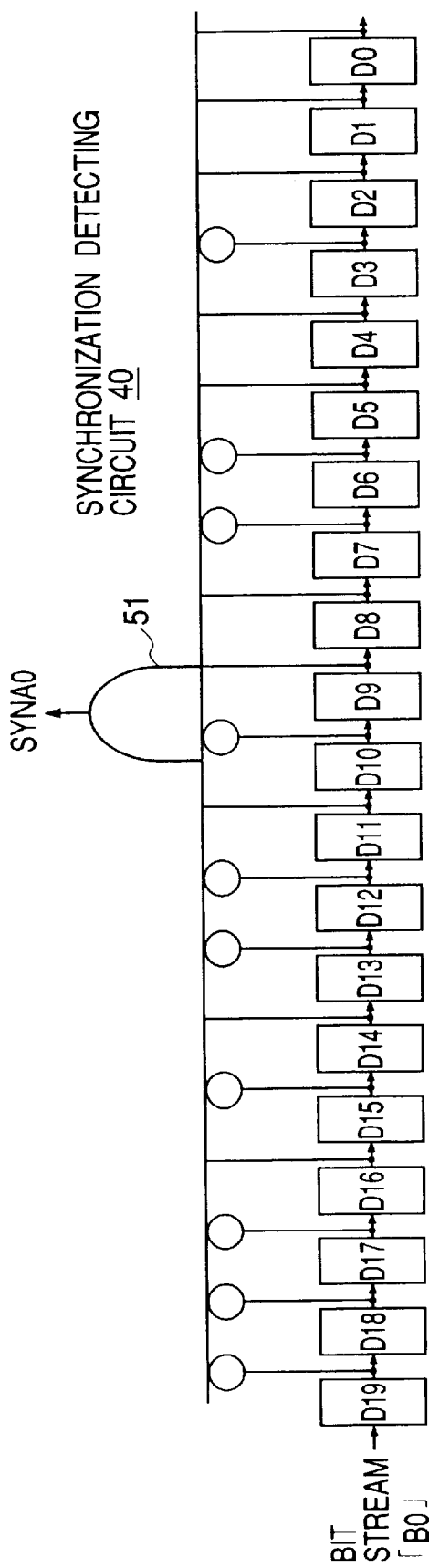
FIG. 26 is a circuit diagram showing a configuration of a sync detecting circuit in FIG. 24.
Figure 27:
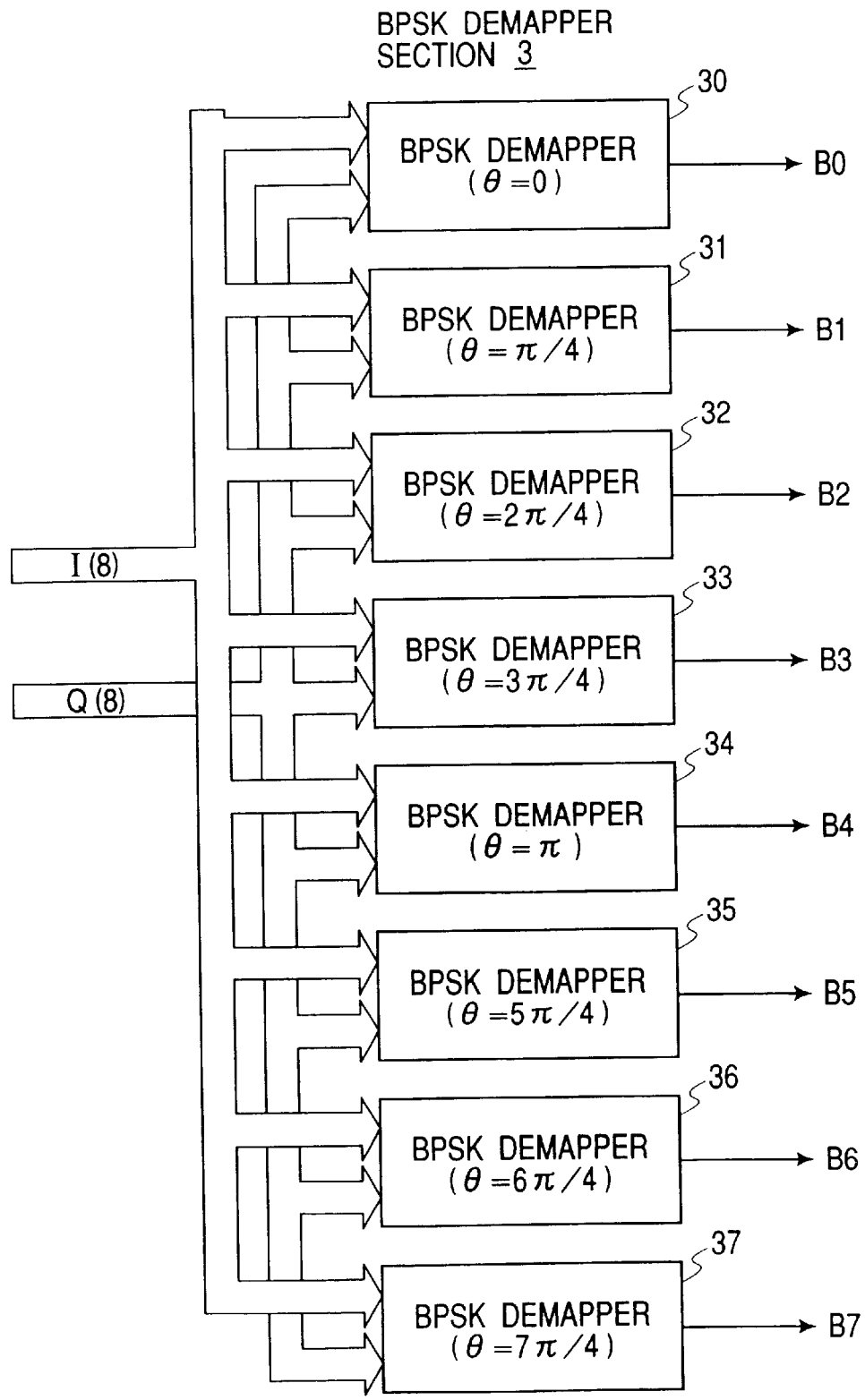
FIG. 27 is a circuit diagram showing a configuration of a BPSK demapper in FIG. 24.
Figure 28A:
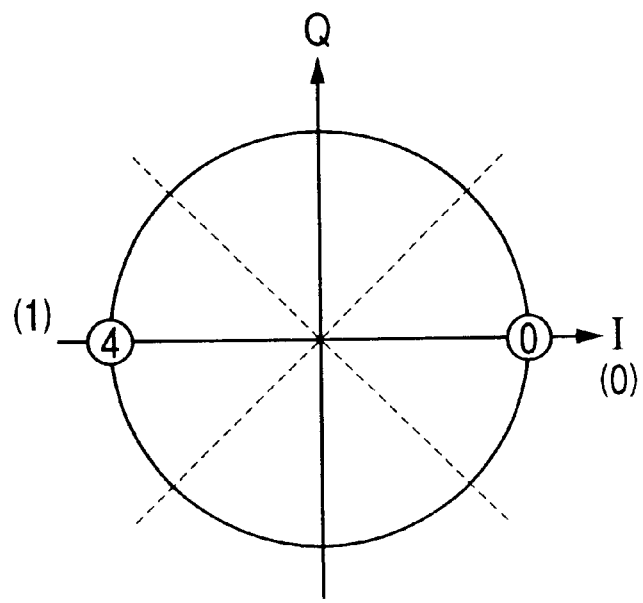
FIGS. 28A and 28B are signal point arrangement diagrams of a frame-synchronizing signal before and after passing through a 0°/180° phase-rotating circuit in FIG. 12.
Figure 28B:
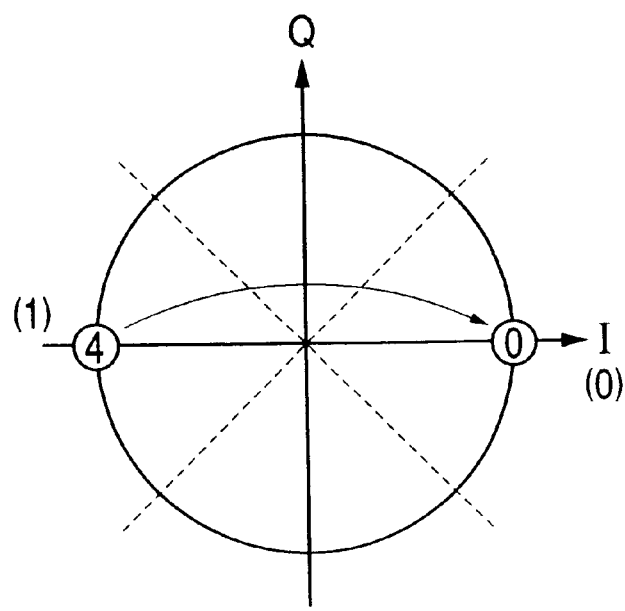
Figure 29:
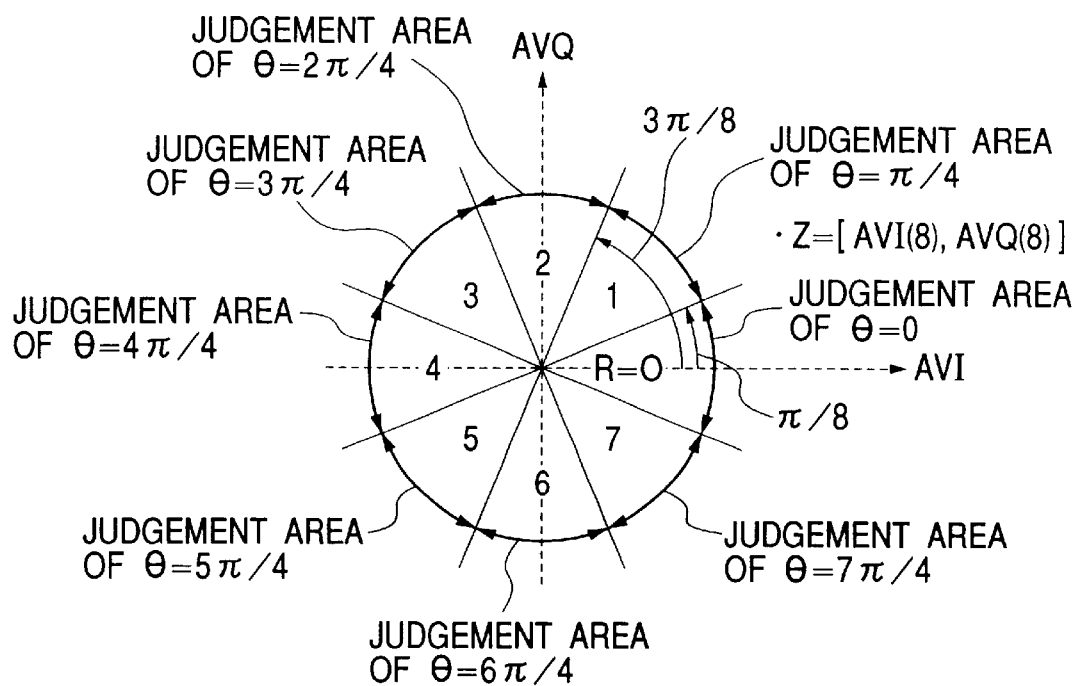
FIG. 29 is an illustration of a received-signal-phase rotation angle discriminating table used by a phase judging circuit in FIG. 12.

When Θ is equal to 3π/4, the selector 16A enables only the phase error table 15-3 (refer to FIG. 22) while the demodulating circuit 1A demodulates a BPSK-modulation-system portion and a symbol clock $CLK_{SYB}$ is activated and reads from the phase error table 15-3 the phase error data Δφ(8) corresponding to I and Q symbol-stream data I(8) and Q(8) output from the demodulating circuit 1A while the symbol clock $CLK_{SYB}$ is activated to output the data Δφ(8) to the D/A converter 17. As a result, phases of the reference carrier waves $f_{c1}$ and $f_{c2}$ are corrected so that digital signals (f) BPSK-mapped to transmission-side signal point arrangements "0" and "4" appear on reception-side signal point arrangements "3" and "7" and therefore, the phases are kept at a phase rotation angle equal to a received-signal-phase rotation angle by 8PSK. Because phases of I and Q symbol-stream data I(8) and Q(8) of the BPSK-modulation-system portion output from the demodulating circuit 1A are also rotated by the remapper 7 by η=-Θ=-3π/4, received-signal points of I and Q symbol-stream data I'(8) and Q'(8) output from the remapper 7 coincide with those of the transmission side.

Moreover, also under the normal receiving operation, the selector 16A enables only the phase error table 15-1 while the symbol clock $CLK_{SYB}$ is not activated and reads from the phase error table 15-1 the phase error data Δφ(3) corresponding to I and Q symbol-stream data I(8) and Q(8) output from the demodulating circuit 1A while the symbol clock $CLK_{SYB}$ is not activated to output the data Δφ(3) to the delay circuit 90. Then, the phase-rotation-angle discriminating circuit 92 discriminates a phase rotation angle in accordance with an output of the delay circuit 90 or 91, outputs a discrimination result in the form of the received-signal-phase rotation angle signal R(3) and the averaging circuit 95 averages discrimination results for four frames and outputs the averaged signal R(3) as the received-signal-phase rotation angle signal AR(3). When a received-signal-phase rotation angle Θ shown by the AR(3) is the same as ever, a phase rotation angle of the remapper 7 is not changed or a phase error table to be selected by the selector 16A is not changed. However, the received-signal-phase rotation angle Θ is changed from ever, the remapper 7 phase-rotates by -Θ from a new Θ. Moreover, the selector 16A changes a phase error table to be selected in accordance with the change of Θ.

According to this embodiment, a rotation angle of I and Q symbol-stream data I(8) and Q(8) of a portion corresponding to bit (1) (bit (0)) of a frame-synchronizing signal is discriminated in accordance with high-order three bits for judging whether the absolute value of an phase error in phase error data according to a phase error table for BPSK modulation corresponding to I and Q symbol-stream data of a portion corresponding to bit (1) (bit (0)) of a demodulated frame-synchronizing signal is larger or smaller than (π/8)+s·(π/4) (s is 0 or 1) and sign bit data i(1) of I symbol-stream data. Therefore, it is possible to discriminate a received-signal-phase rotation angle through a simple operation. Therefore, it is unnecessary to use a large ROM dedicated to discrimination of a phase rotation angle and it is possible to decrease a circuit in size.

The above embodiment uses the sign bit data i(1) of I symbol-stream data I(8). However, it is also permitted to use sign bit data serving as the MSB of Q symbol-stream data Q(8) instead. Moreover, it is permitted to read the phase error data Δφ(3) from one of the phase error tables 15-2, 15-3, and 15-4 instead of reading the data Δφ(3) from the phase error table 15-1. These changes can be performed only by properly changing values of A(4) and B(4) selected by the selector 94.

Moreover, though phase rotation angles of portions of bits (1) and (0) of a frame-synchronizing signal of I and Q symbol-stream data are both discriminated, it is also permitted to discriminate either of the phase rotation angles. Furthermore, an averaging method can be optionally changed by the averaging circuit 95. Therefore, it is also permitted to averages discrimination results for only one frame or two frames or average one bit or a plurality of bits at a specific position or positions of a frame-synchronizing signal for a plurality of frames.

Then, a second embodiment of the present invention will be described below by referring to FIG. 5.

Figure 5:
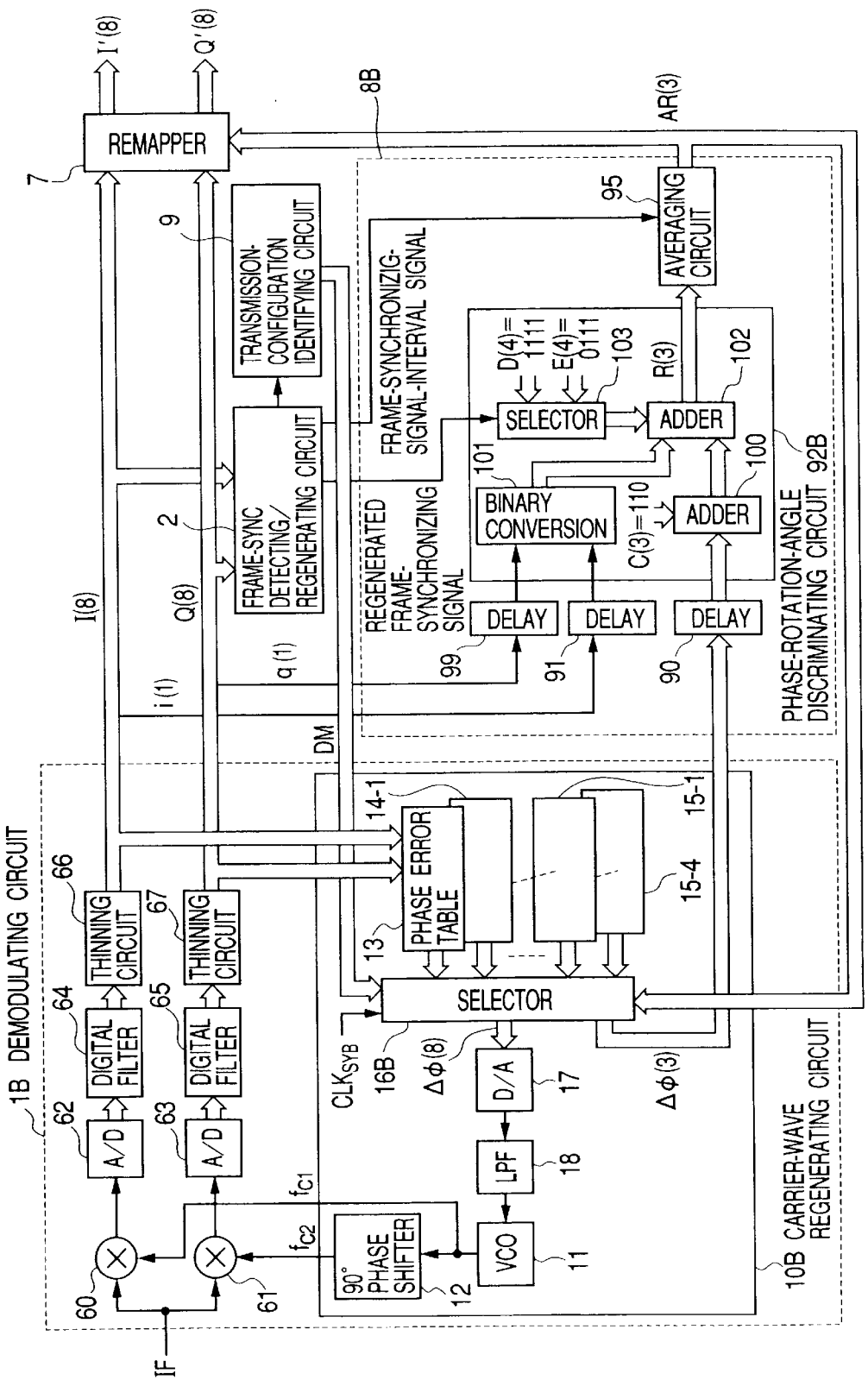
FIG. 5 is a block diagram showing a configuration of an essential portion of a wave to be PSK-modulated receiver of a second embodiment of the present invention.

FIG. 5 is a block diagram of an essential portion of a wave to be PSK-modulated receiver of the present invention, in which a component same as that in FIG. 1 is provided with the same symbol.

In case of the embodiment shown in FIG. 1, phase error data $\Delta\phi(3)$ is read out of the phase error table 15-1 for BPSK. In case of FIG. 5, however, phase error data $\Delta\phi(3)$ is read out of a phase error table 14-1 for QPSK (refer to FIG. 18).

A selector 16B of a carrier-wave regenerating circuit 10B enables only a phase error table 13 for 8PSK while a symbol clock $CLK_{SYB}$ is activated before a transmission-configuration identifying circuit 9 identifies a multiple configuration of a frame and a received-signal-phase rotation angle detecting circuit 8B detects a received-signal-phase rotation angle and reads phase error data $\Delta\phi(8)$ corresponding to I and Q symbol-stream data I(8) and Q(8) output from a demodulating circuit 1A while the symbol clock $CLK_{SYB}$ is activated to output the data $\Delta\phi(8)$ to a D/A converter 17. Moreover, at the same time as the above, the selector 16B enables only the phase error table 14-1 for QPSK while the symbol clock $CLK_{SYB}$ is not activated and reads from the phase error table 14-1 phase error data $\Delta\phi(3)$ of high-order three bits in the phase error data $\Delta\phi(8)$ corresponding to I and Q symbol-stream data I(8) and Q(8) output from the demodulating circuit 1A while the symbol clock $CLK_{SYB}$ is not activated to output the data $\Delta\phi(3)$ to the received-signal-phase rotation angle detecting circuit 8B. It is known in accordance with the phase error data $\Delta\phi(3)$ whether the absolute value of a phase error is larger or smaller than $\pi/8$.

After the transmission-configuration identifying circuit 9 identifies a multiple configuration of a frame and the received-signal-phase rotation angle detecting circuit 8B detects a received-signal-phase rotation angle $\Theta$, the selector 16B reads phase error data $\Delta\phi(8)$ corresponding to I and Q symbol-stream data I(8) and Q(8) in accordance with a modulation system of a received signal demodulated by the demodulating circuit 1B and a phase error table corresponding to the received-signal-phase rotation angle $\Theta$ to output the data $\Delta\phi(8)$ to the D/A converter 17 and moreover, reads from the phase error table 14-1 for QPSK phase error data $\Delta\phi(3)$ corresponding to I and Q symbol-stream data I(8) and Q(8) while the symbol clock $CLK_{SYB}$ is not activated to output the data $\Delta\phi(3)$ to the received-signal-phase rotation angle detecting circuit 8B.

Symbol 90 denotes a delay circuit for delaying phase error data $\Delta\phi(3)$ read by the selector 16B by a predetermined period and then outputting the data. The delay circuit 90 adjusts timing so that phase error data $\Delta\phi(3)$ corresponding to the first portion of a frame-synchronizing signal of I symbol stream data I(8) is output just when a frame-sync detecting/regenerating circuit 2 acquires a frame-synchronizing signal from I and Q symbol-stream data I(8) and Q(8) and starts outputting a regenerated frame-synchronizing signal. Symbol 91 denotes a delay circuit for delaying sign bit data i(1) serving as the MSB of I symbol stream by a predetermined period and then outputting the data. The delay circuit 91 adjusts timing so that the sign bit data i(1) at the first portion of a frame-synchronizing signal of I symbol-stream data I(8) is output just when the frame-sync detecting/regenerating circuit 2 acquires a frame-synchronizing signal from I and Q symbol-stream data I(8) and Q(8) and starts outputting a regenerated frame-synchronizing signal.

Symbol 99 denotes a delay circuit for delaying sign bit data q(1) serving as the MSB of Q symbol-stream data Q(8) by a predetermined period and then outputting the data. The delay circuit 99 adjusts timing so that sign bit data q(1) at the first portion of a frame-synchronizing signal of Q symbol-stream data Q(8) is output just when the frame-sync detecting/regenerating circuit 2 acquires a frame-synchronizing signal from I and Q symbol-stream data I(8) and Q(8) and starts outputting a regenerated frame-synchronizing signal.

Symbol 92B denotes a phase-rotation-angle discriminating circuit for discriminating a phase rotation angle of a symbol portion corresponding to bit (1) of a frame-synchronizing signal in I and Q symbol streams I(8) and Q(8) output from the demodulating circuit 1B against the transmission side from a portion of an output of the delay circuit 90, 91, or 99 corresponding to a frame-synchronizing signal and moreover, discriminating a phase rotation angle of a symbol portion of a frame-synchronizing signal corresponding to bit (0) against the transmission side to successively output discrimination results. In the phase-rotation-angle discriminating circuit 92, symbol 100 denotes a three-bit adder for adding three-bit data (however, carry to fourth bit is not performed), which adds an output of the delay circuit 90 and C(3)=(110) and outputs low-order 2 bits.

Figure 6:
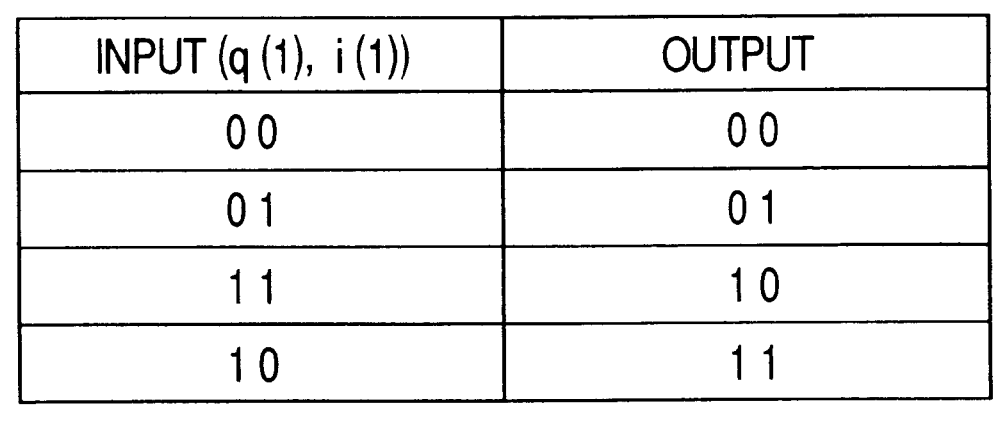

Symbol 101 denotes a binary converter which converts two-bit data obtained by combining an output of the delay circuit 99 as a high-order bit with an output of the delay circuit 91 as a low-order bit into a binary code in accordance with FIG. 6 and outputs the code. Symbol 102 denotes a four-bit adder for adding four-bit data (however, carry to fifth bit is not performed), in which an output of the converter 101 is input to high-order two bits at one input side and low-order two bits of an addition result by the adder 100 is input to low-order two bits at the one input side. A selector 103 is connected to the other input side of the adder 102, which inputs a bit stream of a regenerated frame-synchronizing signal output from the frame-sync detecting/regenerating circuit 2, outputs D(4)=(1111) when the portion of bit (0) is input, and outputs E(4)=(0111) when the portion of bit (1) is input. The adder 102 outputs high-order three bits of an addition result as a received-signal-phase rotation angle signal R(3).

Symbol 95 denotes an averaging circuit for averaging received-signal-phase rotation angle signals R(3). In this case, for example, the averaging circuit 95 averages frame-synchronizing signals for four frames and outputs the averaged signal to the remapper 7 and selector 16B as a received-signal-phase rotation angle signal AR(3). Other portions are configured completely the same as those in FIG. 1 are.

Then, operations of the second embodiment are described below.

(1) Start of Reception

The selector 16B of the carrier-wave regenerating circuit 10B enables only the phase error table 13 for 8PSK while a symbol clock $CLK_{SYB}$ is activated before the transmission-configuration identifying circuit 9 identifies a multiple configuration of a frame and the received-signal-phase rotation angle detecting circuit 8B detects a received-signal-phase rotation angle and reads from the phase error table 13 phase error data $\Delta\phi(8)$ corresponding to the set data of I and Q symbol-stream data I(8) and Q(8) output from the demodulating circuit 1B while the symbol clock $CLK_{SYB}$ is activated to output the data $\Delta\phi(8)$ to the D/A converter 17. Moreover, at the same time as the above, the selector 16B enables only the phase error table 14-1 for QPSK while the symbol clock $CLK_{SYB}$ is not activated and reads out of the phase error table 14-1 phase error data $\Delta\phi(3)$ of high-order three bits in phase error data $\Delta\phi(8)$ corresponding to the set data of I and Q symbol-stream data I(8) and Q(8) output from the demodulating circuit 1B while the symbol clock $CLK_{SYB}$ is not activated to output the data Δϕ(3) to the delay circuit 90.

Because the selector 16B reads the phase error data Δϕ(8) out of the phase error table 13 for 8PSK and outputs the data to the D/A converter 17, the demodulating circuit 1B corrects digital signals of signal point arrangements "0" to "7" of phases 0, π/4, 2π/4, 3π/4, 4π/4, 5π/4, 6π/4, and 7π/4 at the transmission side to positions rotated by Θ=m×π/4 (m is any one of integers 0 to 7) on the I-Q phase plane at the reception side.

Figure 18:
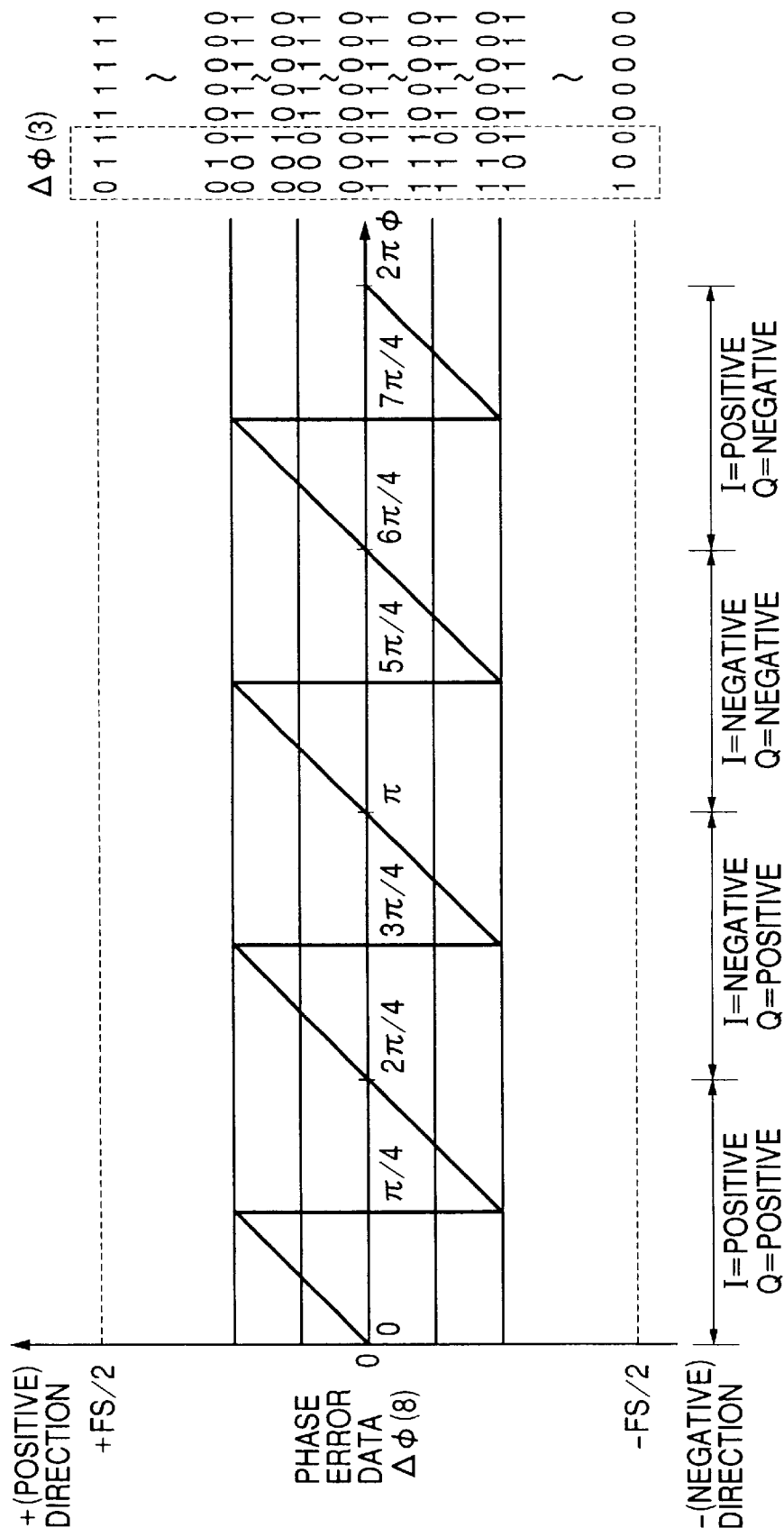
FIG. 18 is an illustration showing a phase error table for QPSK.

In the phase error table 14-1, high-order three bits Δϕ(3) of phase error data Δϕ(8) corresponding to I and Q symbol-stream data I(8) and Q(8) denote the number of bits for judging whether the absolute value of a phase error is larger or smaller than π/8 (refer to FIG. 18). By combining the Δϕ(3) with sign bit data i(1) and q(1) serving as the MSBs of I and Q symbol-stream data I(8) and Q(8) and performing a simple operation, it is possible to discriminate to which of eight signal point arrangements "0" to "7" a received-signal point corresponds. Because the transmission-side signal point arrangement of the portion of bit (0) (or bit (1)) of a frame-synchronizing signal is determined as "0" (or "4"), a received-signal-phase rotation angle is univocally obtained from Δϕ(3) and sign bit data i(1) and q(1) of I and Q symbol-stream data I(8) and Q(8).

When the delay circuits 90, 91, 99 delay phase error data Δϕ(3) output from the selector 16B, sign bit data i(1) of I symbol stream data I(8) fetched from an output of the demodulating circuit 1, and sign bit data q(1) of Q symbol stream data Q(8), and the frame-sync detecting/regenerating circuit 2 acquires a frame-synchronizing signal from I and Q symbol-stream data and starts outputting a regenerated frame-synchronizing signal, the received-signal-phase rotation angle detecting circuit 8B adjusts timings so that phase error data Δϕ(3) corresponding to the head of a frame-synchronizing-signal portion of I symbol stream data I(8) is output from the delay circuit 90, sign bit data i(1) corresponding to the head of a frame-synchronizing signal of I symbol stream data I(8) is output from the delay circuit 91, and sign bit data q(1) corresponding to the head of a frame-synchronizing-signal portion of Q symbol-stream data Q(8) is output from the delay circuit 99. Outputs of the delay circuits 99 and 91 are binary-converted and then, input as high-order bits of one input of the adder 102. An output of the delay circuit 90 is added with (3)=(110) by the adder 100 and then input as low-order two bits of one input of the adder 102.

Figures 2A, 2B:
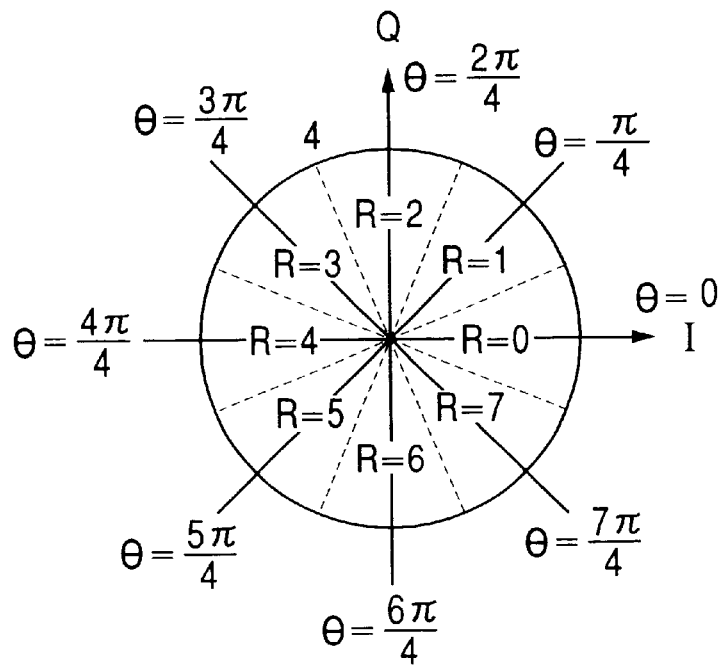
FIGS. 2A and 2B are illustrations showing relations between received-signal-phase rotation angle signals output by a phase-rotation-angle discriminating circuit in FIG. 1 and received-signal-phase rotation angles.

When a certain time elapses after start of reception, the frame-sync detecting/regenerating circuit 2 acquires a frame-synchronizing signal of I and Q symbol streams I(8) and Q(8) and outputs a regenerated frame-synchronizing signal. Then, the selector 103 selects D(4)=(1111) at the portion of bit (0) of the regenerated frame-synchronizing signal and outputs it, and moreover selects E(4)=(0111) at the portion of bit (1) and outputs it. The adder 102 adds one input with the other input at each bit position of a 20-bit regenerated frame-synchronizing signal and outputs high-order three bits. Then, the adder 102 outputs a received-signal-phase rotation angle signal R(3) obtained by expressing R with a three-bit natural binary number at the time of dividing a received-signal-phase rotation angle Θ into 0, π/4, π/4, 3π/4, 4π/4, 5π/4, 6π/4, and 7π/4 as shown in FIG. 2A and relating it to R=0–7 of decimal notation (refer to FIG. 2B}.

The averaging circuit 95 captures outputs of the adder 102 while inputting frame-synchronizing-signal-interval signals from the frame-sync detecting/regenerating circuit 2, averages the signals for 4 frames similarly to the case of FIG. 1, and outputs an averaging result to the remapper 7 as a received-signal-phase rotation angle signal AR(3) to make the remapper 7 generate an absolute phase. Moreover, the averaging circuit 95 outputs the received-signal-phase rotation angle signal AR(3) to the selector 16B.

(2) Normal Receiving Operation

Immediately after the frame-sync detecting/regenerating circuit 2 acquires a frame-synchronizing signal, the transmission-configuration identifying circuit 9 identifies a multiple configuration and outputs a modulation-system-identifying signal DM showing to which modulation-system portion the present I and Q symbol-streams I(8) and Q(8) output from the demodulating circuit 1B correspond to the selector 16B or the like.

The selector 16B receiving the received-signal-phase rotation angle signal AR(3) from the averaging circuit 95 enables only the phase error table 13 while the demodulating circuit 1B demodulates the 8PSK-modulation-system portion and a symbol clock $CLK_{SYB}$ is activated when a received-signal-phase rotation angle Θ shown by AR(3) is equal to, for example, 2π/4 by using a modulation-system identifying signal DM received from the transmission-configuration identifying circuit 9 and reads phase error data Δϕ(8) corresponding to I and Q symbol-stream data I(8) and Q(8) out of the phase error table 13 to output the data Δϕ(8) to the D/A converter 17. As a result, phases of the reference carrier waves $f_{c1}$ and $f_{c2}$ are corrected so that digital signals (abc) 8PSK-mapped to transmission-side signal-point arrangements "0", "1", "2", "3", "4", "5", "6", and "7" appear on reception-side signal point arrangements "2", "3", "4", "5", "6", "7", "0", and "1", independently of phase change of the received carrier waves.

Because phases of I and Q symbol-stream data I(8) and Q(8) of the 8PSK-modulation-system portion output from the demodulating circuit 1B are rotated by the remapper 7 by η=−Θ=−2π/4, received-signal points of I and Q symbol-stream data I'(8) and Q'(8) output from the remapper coincide with those of the transmission side.

When Θ is equal to 2π/4, the selector 16B enables only the phase error table 14-1 while the demodulating circuit 1B demodulates a QPSK-modulation-system portion and a symbol clock $CLK_{SYB}$ is activated and reads from the phase error table 14-1 and reads the phase error data Δϕ(8) corresponding to I and Q symbol-stream data I(8) and Q(8) to output the data Δϕ(8) to the D/A converter 17. As a result, phases of the reference carrier waves $f_{c1}$ and $f_{c2}$ are corrected so that digital signals (de) QPSK-mapped to transmission-side signal point arrangements "1", "3", "5", and "7" appear on reception-side signal point arrangements "3", "5", "7", and "1". Therefore, the signals are held at the same phase rotation angle as the received-signal-phase rotation angle at 8PSK. Moreover, because phases of I and Q symbol-stream data I(8) and Q(8) of the QPSK-modulation-system portion output from the demodulating circuit 1B are rotated by the remapper 7 by Θ=−Θ=−2π/4, received-signal points of I and Q symbol stream data I'(8) and Q'(8) output from the remapper 7 coincide with those of the transmission side.

When Θ is equal to 2π/4, the selector 16B enables only a phase error table 15-3 while the demodulating circuit 1B demodulates a BPSK-modulation-system portion and a symbol clock $CLK_{SYB}$ is activated and reads phase error data Δϕ(8) corresponding to I and Q symbol-stream data I(8) and Q(8) out of the phase error table 15-3 to output the data Δϕ(8) to the D/A converter 17. As a result, because phases of the reference carrier waves $f_{c1}$ and $f_{c2}$ are corrected so that digital signals (f) BPSK-mapped to transmission-side signal point arrangements "0" and "4" appear on reception-side signal point arrangements "2" and "6", the signals are kept at the same phase angle as the received-signal-phase rotation angle at 8PSK. Moreover, because phases of I and Q symbol-stream data I(8) and Q(8) at the BPSK-modulation-system portion output from the demodulating circuit 1B are rotated by the remapper 7 by η=−Θ=−2π/4, received signal points of I and Q symbol-stream data I'(8) and Q'(8) output from the remapper 7 coincide with those of the transmission side.

Also under the normal receiving operation, the selector 16B enables only the phase error table 14-1 while the symbol clock $CLK_{SYB}$ is not activated and reads phase error data Δφ(3) corresponding to I and Q symbol-stream data I(8) and Q(8) output from the demodulating circuit 1B out of the phase error table 14-1 while the symbol clock $CLK_{SYB}$ is not activated to output the data Δφ(3) to the delay circuit 90. Then, the phase-rotation-angle discriminating circuit 92B discriminates a phase rotation angle in accordance with an output of the delay circuit 90, 91, or 99 and outputs discrimination results in the form of received-signal-phase rotation angle signals R(3), and the averaging circuit 95 averages signals R(3) for four frames to output averaged signals R(3) as received-signal-phase rotation angle signals AR(3). When a received-signal-phase rotation angle Θ shown by AR(3) is the same as ever, a phase rotation angle of the remapper 7 is not changed or a phase error table selected by the selector 16B is not changed. However, when the angle Θ is not the same as ever, the remapper 7 phase rotates by −Θ from new Θ. Moreover, the selector 16B changes a phase error table to be selected in accordance with a change of Θ.

This embodiment discriminates a phase rotation angle of I and Q symbol-stream data I(8) and Q(8) at a portion corresponding to bit (1) (bit (0)) of a frame-synchronizing signal in accordance with high-order three bits for judging whether the absolute value of a phase error is larger or smaller than π/8 in the phase error data according to the phase error table 14-1 for QPSK modulation corresponding to I and Q symbol-stream data at a portion corresponding to bit (1) (bit (0)) of a demodulated frame-synchronizing signal and sign bit data i(1) and q(1) of I and Q symbol stream-data I(8) and Q(8). Therefore, it is possible to discriminate a received-signal-phase rotation angle through a simple operation. Thus, it is unnecessary to use a large ROM dedicated to discrimination of a phase rotation angle and it is possible to decrease a circuit in size.

Moreover, the above embodiment reads phase error data Δφ(3) out of the phase error table 14-1. However, it is also permitted to read the phase error data Δφ(3) out of a phase error table 14-2. This change can be made by properly changing C(3) added by the adder 100 and D(4) and E(4) selected by the selector 103.

Moreover, though phase rotation angles of both the portions of bits (1) and (0) of a frame-synchronizing signal in I and Q symbol-stream data I(8) and Q(8) are discriminated, it is also permitted to discriminate only either of the phase rotation angles. Furthermore, an averaging method can be optionally changed. Therefore, it is permitted to average discrimination result for one frame or two frames or average one bit or a plurality of bits at a specific position or positions of a frame-synchronizing signal for a plurality of frames.

Then, a third embodiment of the present invention will be described below by referring to FIG. 7.

Figure 7:
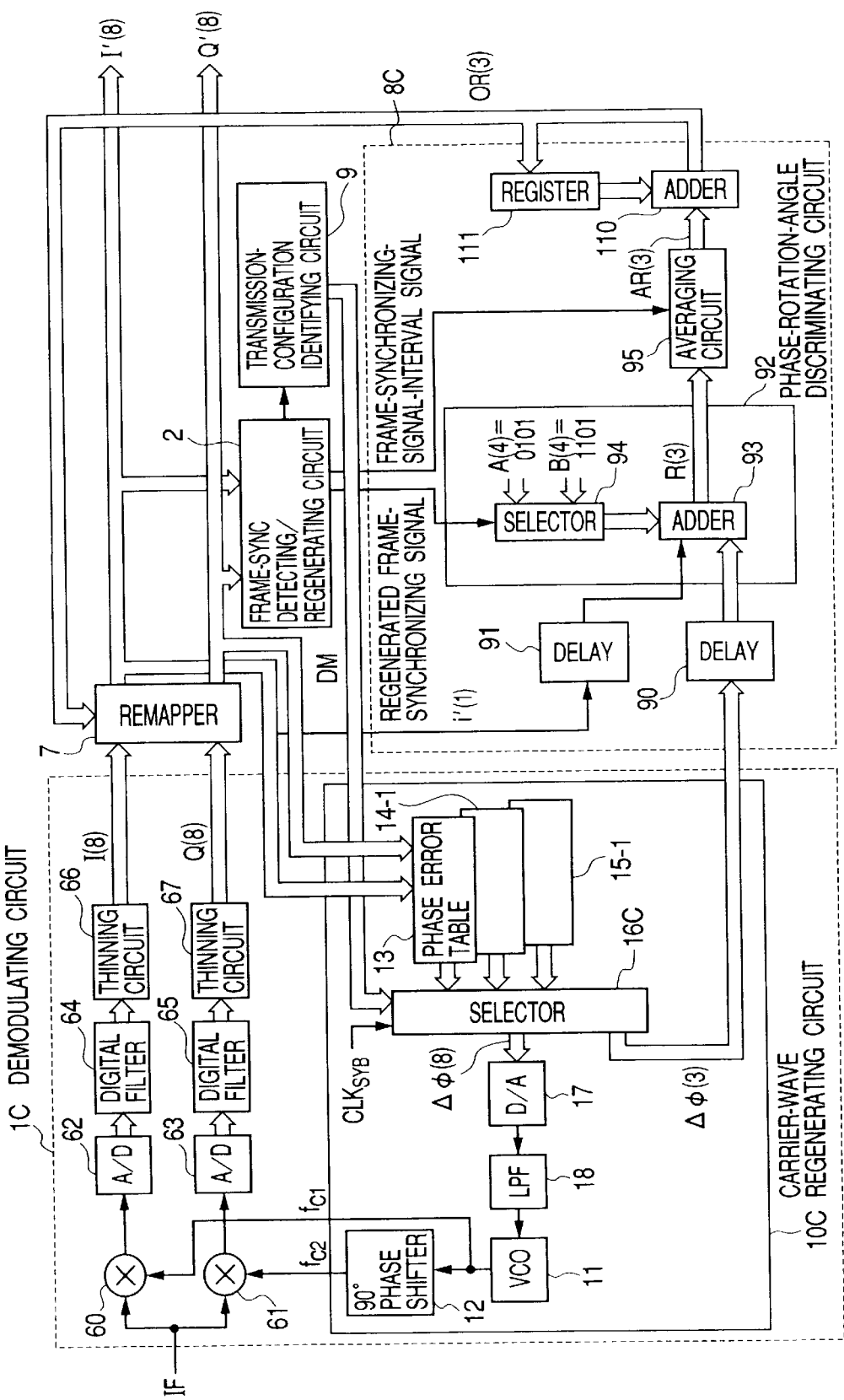
FIG. 7 is a block diagram showing a configuration of an essential portion of a wave-to-be-PSK-modulated receiver of a third embodiment of the present invention.

FIG. 7 is a block diagram of an essential portion of a wave to be PSK-modulated receiver of the present invention, in which a component same as that in FIG. 1 is provided with the same symbol.

The first embodiment in FIG. 1 has seven phase error tables 13, 14-1 and 14-2, and 15-1 to 15-4 in a carrier-wave regenerating circuit and inputs I and Q symbol-stream data I(8) and Q(8) output from a demodulating circuit. In FIG. 7, however, only three phase error tables 13, 14-1, and 15-1 are used and I and Q symbol-stream data I'(8) and Q'(8) output from a remapper 7 are input. Moreover, the remapper 7 does not detect phase rotation of I and Q symbol-stream data I(8) and Q(8) output from a demodulating circuit before a received-signal-phase rotation angle is detected by a received-signal-phase rotation angle detecting circuit but it directly outputs input data.

A selector 16C of a carrier-wave regenerating circuit 10C enables only a phase error table 13 for 8PSK while a symbol clock $CLK_{SYB}$ is activated before a transmission-configuration identifying circuit 9 identifies a multiple configuration of a frame and a received-signal-phase rotation angle detecting circuit 8C detects a received-signal-phase rotation angle after start of reception and reads from the phase error table 13 phase error data Δφ(8) corresponding to I and Q symbol-stream data I'(8) and Q'(8) output from the remapper 7 while the symbol clock $CLK_{SYB}$ is activated to output the data Δφ(8) to a D/A converter 17. Moreover, at the same time as the above, the selector 16C enables only the phase error table 15-1 for BPSK while the symbol clock $CLK_{SYB}$ is not activated and reads from the phase error table 15-1 high-order three bits (hereafter referred to as phase error data Δφ(3)) in phase error data Δφ(8) corresponding to I and Q symbol-stream data I'(8) and Q'(8) output from the remapper 7 while the symbol clock $CLK_{SYB}$ is not activated to output the data Δφ(3) to a delay circuit 90 of the received-signal-phase rotation angle detecting circuit 8C. It is known from the phase error data Δφ(3) whether the absolute value of a phase error is larger or smaller than (π/8)+s·(π/4) (s is 0 or 1).

After the transmission-configuration identifying circuit 9 identifies a multiple configuration of a frame and the received-signal-phase rotation angle detecting circuit 8C detects a received-signal-phase rotation angle Θ, the selector 16C enables only one of the phase error tables 13, 14-1, and 15-1 corresponding to a modulation system of a received signal demodulated by a demodulating circuit 1C while the symbol clock $CLK_{SYB}$ is activated and reads phase error data Δφ(8) corresponding to I and Q symbol-stream data I'(8) and Q'(8) output from the remapper 7 while the symbol clock $CLK_{SYB}$ is activated to output the data Δφ(8) to D/A converter 17. Moreover, the selector 16C enables only the phase error table 15-1 for BPSK while the symbol clock $CLK_{SYB}$ is not activated and reads out of the phase error table 15-1 phase error data Δφ(3) of high-order three bits in phase error data Δφ(8) corresponding to I and Q symbol-stream data I'(8) and Q'(8) output from the remapper 7 while the symbol clock $CLK_{SYB}$ is not activated to output the data Δφ(3) to a delay circuit 90.

Symbol 90 denotes a delay circuit for delaying phase error data Δφ(3) read by the selector 16C by a predetermined period and then outputting the data. The delay circuit 90 adjusts timing so that phase error data Δφ(3) corresponding to the first portion of a frame-synchronizing signal of I symbol-stream data I'(8) is output just when a frame-sync detecting/regenerating circuit 2 acquires a frame-synchronizing signal from I and Q symbol-stream data I'(8) and Q'(8) output from the remapper 7 and starts outputting a regenerated frame-synchronizing signal. Symbol 91 denotes a delay circuit for delaying sign bit data i'(1) serving as the MSB of I symbol-stream data I'(8) by a predetermined period and then outputting it. The delay circuit 91 adjusts timing so that sign bit data i'(1) at the first portion of a frame-synchronizing signal of I symbol-stream data I'(8) is output just when the frame-sync detecting/regenerating circuit 2 acquires a frame-synchronizing signal from I and Q symbol-stream data I'(8) and Q'(8) and starts outputting a regenerated frame-synchronizing signal.

Symbol 92 denotes a phase-rotation-angle discriminating circuit, discriminates a phase rotation angle against the transmission side about a symbol portion corresponding to bit (1) of a frame-synchronizing signal in I and Q symbol streams I'(8) and Q'(8) and moreover discriminates a phase rotation angle against the transmission side about a symbol portion corresponding to bit (0) of the frame-synchronizing signal to successively output a discrimination result as a received-signal-phase rotation angle signal R(3).

Symbol 95 denotes an averaging circuit for averaging received-signal-phase rotation angle signals R(3). In this case, as an example, the averaging circuit 95 averages frame-synchronizing signals for four frames and outputs the averaging result as a received-signal-phase rotation angle signal AR(3). Symbol 110 denotes a three-bit adder for adding the last received-signal-phase rotation angle signal OR(3) held by a register 111 and this-time received-signal-phase rotation angle signal AR(3) every when the averaging circuit 95 outputs the received-signal-phase rotation-angle signal AR(3) and outputting the addition result to the remapper 7 and selector 16C as a new received-signal-phase rotation angle signal OR(3) (however, carry to fourth bit is not performed). Symbol 111 denotes a register for holding a received-signal-phase rotation angle signal OR(3) output by the adder 110. Operations of the adder 110 and register 111 are described later.

Other components are completely the same as those in FIG. 1.

Then, operations of the third embodiment will be described.

In this case, it is assumed that the register 111 is previously cleared to (000).

(1) Start of Reception

The remapper 7 does not perform phase rotation at start of reception but it directly outputs I and Q symbol streams I(8) and Q(8) received from the demodulating circuit 1C as I'(8) and Q'(8).

The selector 16C of the carrier-wave regenerating circuit 10C enables only the phase error table 13 for 8PSK while a symbol clock $CLK_{SYB}$ is activated before the transmission-configuration identifying circuit 9 identifies a multiple configuration of a frame and the received-signal-phase rotation angle detecting circuit 8C detects a received-signal-phase rotation angle after start of reception and reads from the phase error table 13 phase error data Δϕ(8) corresponding to I and Q symbol-stream data I'(8) and Q'(8) output from the remapper 7 while the symbol clock $CLK_{SYB}$ is activated to output the data Δϕ(8) to the D/A converter 17. Moreover, at the same time as the above, the selector 16C enables only the phase error table 15-1 for BPSK while the symbol clock $CLK_{SYB}$ is not activated and reads from the phase error table 15-1 phase error data Δϕ(3) of high-order three bits in phase error data Δϕ(8) corresponding to I and Q symbol-stream data I'(8) and Q'(8) output from the remapper 7 while the symbol clock $CLK_{SYB}$ is not activated to output the data Δϕ(3) to the delay circuit 90.

Because the selector 16C reads phase error data Δϕ(3) out of the phase error table 13 for 8PSK and outputs the data Δϕ(3) to the D/A converter 17, the demodulating circuit 1C corrects digital signals of signal point arrangements "0" to "7" of phases 0, π/4, 2π/4, 3π/4, 4π/4, 5π/4, 6π/4, and 7π/4 at the transmission side to positions rotated by Θ=m×π/4 (m is any one of integers 0 to 7) on the I-Q phase plane at the reception side.

Moreover, in the phase error table 15-1, high-order three bits Δϕ(3) of phase error data Δϕ corresponding to I and Q symbol-stream data I'(8) and Q'(8) denote the number of bits for judging whether the absolute value of a phase error is larger or smaller than (π/8)+s·(π/4) (s is 0 or 1). By combining the phase error data Δϕ(3) with sign bit data i'(1) serving as the MSB of I symbol-stream data I'(8) and performing a simple operation, it is possible to discriminate to which of eight signal arrangements "0" to "7" a received-signal point viewed from the output side of the remapper 7 corresponds. Because the signal arrangement of the portion of bit (0) (or bit (1)) of a frame-synchronizing signal at the transmission side is determined as "0" (or "4"), a received-signal-phase rotation angle viewed from the output side of the remapper 7 is univocally obtained from phase error data Δϕ(3) and i'(1).

When the delay circuits 90 and 91 delay the phase error data Δϕ(3) output from the selector 16C and the sign bit data i'(1) of I symbol stream data I'(8) fetched from an output of the remapper 7 and the frame-sync detecting/regenerating circuit 2 acquires a frame-synchronizing signal from I and Q symbol-stream data I'(8) and Q'(8) and starts outputting a regenerated frame-synchronizing signal, the received-signal-phase rotation angle detecting circuit 8C first adjusts timings so that phase error data Δϕ(3) corresponding to the head of a frame-synchronizing-signal portion of I symbol-stream data I(8) is output from the delay circuit 90 and sign bit data i'(1) corresponding to the head of a frame-synchronizing-signal portion of I symbol-stream data I'(8) is output from the delay circuit 91. Outputs of the delay circuits 91 and 90 are input as a high-order bit and a low-order bit of one input side of an adder 93.

When a certain time elapses after start of reception, the frame-sync detecting/regenerating circuit 2 acquires a frame-synchronizing signal of I and Q symbol-streams I'(8) and Q'(8) and outputs a regenerated frame-synchronizing signal. Then, a selector 94 selects A(4)=(0101) at the portion of bit (0) of the regenerated frame-synchronizing signal to output it and selects B(4)=(1101) at the portion of bit (1) to output it. The adder 93 adds one input and the other input at each bit position of a 20-bit regenerated frame-synchronizing signal to output high-order three bits. Then, the adder 93 outputs a received-signal-phase rotation angle signal R(3) obtained by dividing a received-signal-phase rotation angle Θ viewed from the output side of the remapper 7 into 0, π/4, 2π/4, 3π/4, 4π/4, 5π/4, 6π/4, and 7π/4 as shown in FIG. 2A, relating them to R=0 to 7 of decimal notation, and expressing R by a three-bit natural binary number (refer to FIG. 2B).

The averaging circuit 95 captures outputs of the adder 93 while inputting frame-synchronizing-signal-interval signals from the frame-sync detecting/regenerating circuit 2, averages the outputs for four frames similarly to the case of FIG. 1, and outputs the averaging result as a received-signal-phase rotation angle signal AR(3). The AR(3) is added with a holding value of the register 111 by the adder 110. However, because the holding value is (000) at first, the averaging circuit 95 directly outputs the AR(3) to the remapper 7 as a received-signal-phase rotation angle signal OR(3) against the transmission side viewed from an output point of the demodulating circuit 1C and moreover, outputs the AR(3) to the register 111 to make the register 111 hold the AR(3). For example, when a received-signal-phase rotation angle Θ shown by the OR(3) is equal to 3π/4, the remapper 7 phase-rotates by −3π/4 to generate an absolute phase. The register 111 holds (011).

(2) Normal Receiving Operation

Immediately after the frame-sync detecting/regenerating circuit 2 acquires a frame-synchronizing signal, the transmission-configuration identifying circuit 9 identifies a multiple configuration and outputs a modulation-system identifying signal DM showing to which modulation-system portion the present I and Q symbol streams I(8) and Q(8) output from the demodulating circuit 1C correspond, to the selector 16C or the like.

When a received-signal-phase rotation angle signal OR(3) is output from the adder 110 and an absolute phase is generated by the remapper 7, the selector 16C enables only the phase error table 13 while the demodulating circuit 1C demodulates the 8PSK-modulation-system portion and a symbol clock CLK$_{SYB}$ is activated by using the modulation-system identifying signal DM input from the transmission-configuration identifying circuit 9 and reads out of the phase error table 13 phase error data Δϕ(8) corresponding to I and Q symbol-stream data I'(8) and Q'(8) to output the data Δϕ(8) to the D/A converter 17. As a result, at the time of considering phases of I'(8) and Q'(8) rotate by η=−Θ=−3π/4 compared to the case of I(8) and Q(8), phases of the reference carrier waves $f_{c1}$ and $f_{c2}$ are corrected so that received-signal points of digital signals (abc) 8PSK-mapped to transmission-side signal point arrangements "0", "1", "2," "3", "4", "5", "6", and "7" appear on signal point arrangements "3", "4", "5", "6", "7", "0", "1", and "2" respectively phase-rotated by Θ viewed from the input side of the remapper 7.

In this case, phases of I and Q symbol-stream data I(8) and Q(8) at the 8PSK-modulation-system portion output from the demodulating circuit 1C are rotated by the remapper 7 by η=−Θ=−3π/4 and absolute phases are generated. Therefore, received-signal points of I and Q symbol-stream data I'(8) and Q'(8) output from the remapper 7 coincide with those of the transmission side.

The selector 16C enables only the phase error table 14-1 while the demodulating circuit 1C demodulates the QPSK-modulation-system portion and the symbol clock CLK$_{SYB}$ is activated and reads out of the phase error table 14-1 phase error data Δϕ(8) corresponding to I and Q symbol-stream data I'(8) and Q'(8) to output the data Δϕ(8) to the D/A converter 17. Thereby, at the time of considering that phases of the I'(8) and Q'(8) rotate by η=−Θ=−3π/4 compared to the case of I(8) and Q(8), phases of the reference carrier waves $f_{c1}$ and $f_{c2}$ are corrected so that digital signals (de) QPSK-mapped to transmission-side signal point arrangements "1", "3", "5", and "7" appear on signal point arrangements "4", "6", "0", and "2" viewed from the input side of the remapper 7. Therefore, the digital signals (de) are held at the same rotation angle as the received-signal-phase rotation angle Θ at 8PSK. Because phases of the I and Q symbol-stream data I(8) and Q(8) at the QPSK-modulation-system portion output from the demodulating circuit 1C are rotated by the remapper 7 by −Θ=−3π/4, received-signal points of I and Q symbol stream data I'(8) and Q'(8) output from the remapper 7 coincide with those of the transmission side.

The selector 16C enables only the phase error table 15-1 while the demodulating circuit 1C demodulates the BPSK-modulation-system portion and the symbol clock CLK$_{SYB}$ is activated and reads out of the phase error table 15-1 phase error data Δϕ(8) corresponding to I and Q symbol-stream data I'(8) and Q'(8) to output the data Δϕ(8) to the D/A converter 17. Thereby, at the time of considering that phases of the I'(8) and Q'(8) rotate by −Θ=−3π/4 compared to the case of I(8) and Q(8), phases of the reference carrier waves $f_{c1}$ and $f_{c2}$ are corrected so that digital signals (f) BPSK-mapped to transmission-side signal point arrangements "0" and "4" appear on signal point arrangements "3" and "7" viewed from the input side of the remapper 7. Therefore, the signals (f) are held at the same rotation angle as the received-signal-phase rotation angle Θ at 8PSK. Because phases of I and Q symbol-stream data I(8) and Q(8) at the BPSK-modulation-system portion output from the demodulating circuit 1C are rotated by the remapper 7 by −Θ=−3π/4, received-signal points of I and Q symbol-stream data I'(8) and Q'(8) coincide with those of the transmission side.

Also under the normal receiving operation, the selector 16C enables only the phase error table 15-1 while the symbol clock CLK$_{SYB}$ is not activated and reads from the phase error table 15-1 phase error data Δϕ(3) corresponding to I and Q symbol-stream data I(8)' and Q(8)' output from the remapper 7 while the symbol clock CLK$_{SYB}$ is not activated to output the data Δϕ(3) to the delay circuit 90. Moreover, the phase-rotation-angle discriminating circuit 92 discriminates a phase rotation angle in accordance with an output of the delay circuit 90 or 91 to output discrimination results in the form of received-signal-phase rotation angle signals R(3) and the averaging circuit 95 averages the signals R(3) for four frames to output the averaging result as a received-signal-phase rotation angle signal AR(3).

When the phase-rotation-angle discriminating circuit 92 and averaging circuit 95 of the received-signal-phase rotation angle detecting circuit 8C perform second-time phase-rotation-angle detection and output a received-signal-phase rotation angle signal AR(3), the received-signal-phase rotation angle signal AR(3) shows a phase rotation angle against the transmission side viewed from I'(8) and Q'(8) after their absolute phases are generated by the remapper 7. Therefore, by adding the signal AR(3) with the last-time received-signal-phase rotation angle signal OR(3) held by the register 111, a received-signal-phase rotation angle signal OR(3) against the transmission side viewed from the input side of the remapper 7 is obtained and the received-signal-phase rotation angle signal OR(3) is output to the remapper 7 to make the remapper 7 perform second-time phase rotation (at the time of assuming a received-signal-phase rotation angle shown by the OR(3) as Θ, the demapper 7 performs phase rotation by −Θ) and to make the register 110 hold the signal OR(3). Hereafter, the same processing is repeated whenever the phase-rotation-angle discriminating circuit 92 and averaging circuit 95 of the received-signal-phase rotation angle detecting circuit 8C detect a new phase rotation angle.

According to this embodiment, I and Q symbol-stream data I'(8) and Q'(8) after their absolute phases are generated by the remapper 7 are input to phase error tables of the carrier-wave regenerating circuit 10C. Therefore, received-signal points of I and Q symbol-stream data I'(8) and Q'(8) input to phase error tables become the same as those of the transmission side independently of a value of a received-signal-phase rotation angle under normal reception. Therefore, it is enough to provide one phase error table for the carrier-wave regenerating circuit 10 every modulation system. Thus, it is possible to decrease the number of phase error tables provided for the carrier-wave regenerating circuit 10C and greatly simplify the circuit configuration.

Though the embodiment in FIG. 7 uses sign bit data i'(1) of I symbol-stream data I'(8), it is also permitted to use sign bit data serving as the MSB of Q symbol-stream data Q'(8).

Figure 8:
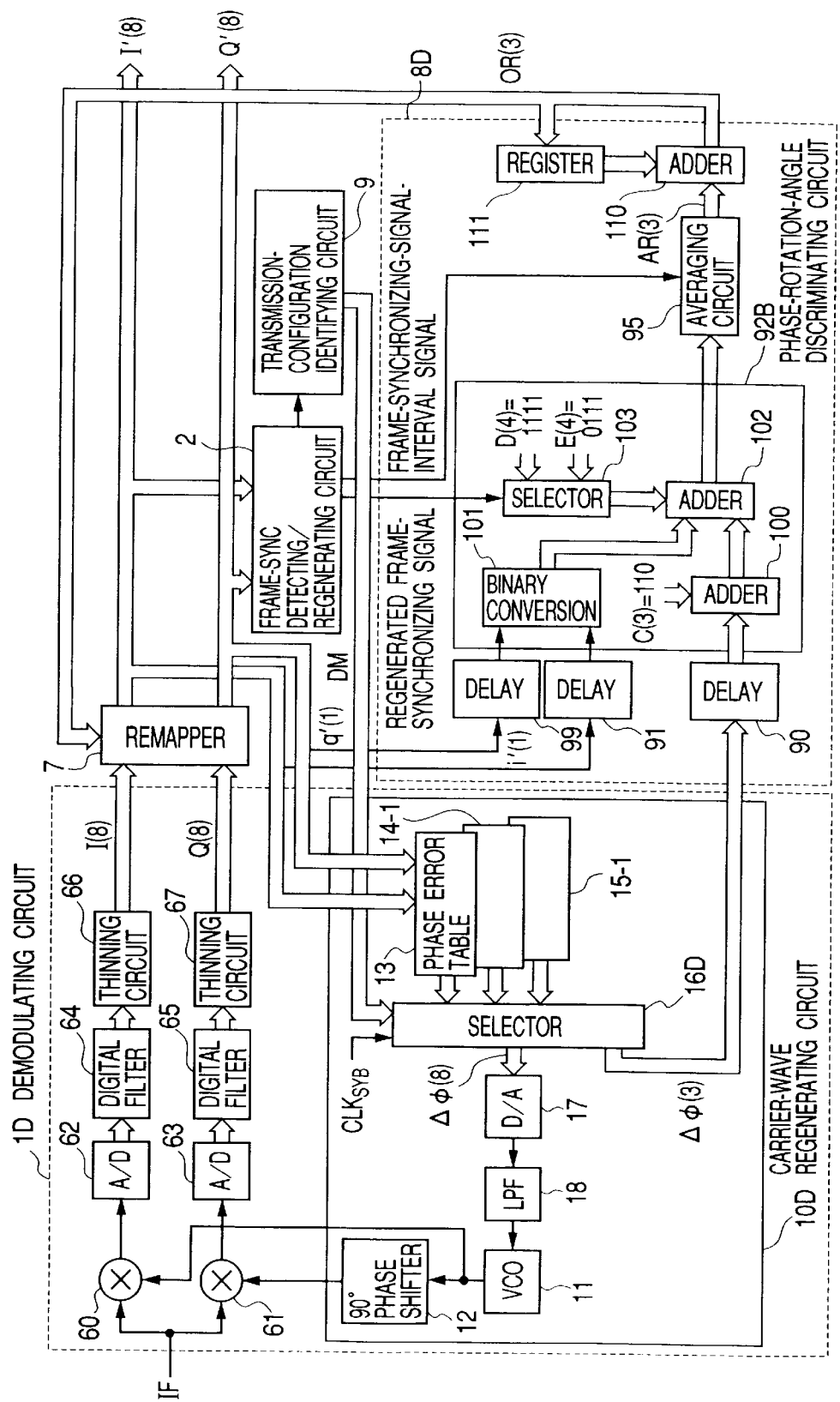
FIG. 8 is a block diagram showing a configuration of an essential portion of a wave to be PSK-modulated receiver of a modification.

The configuration in FIG. 7 can be modified to that in FIG. 8. That is, the carrier-wave regenerating circuit 10C of the demodulating circuit 1D in FIG. 8 is provided with three phase error tables 13, 14-1, and 15-1 so as to read phase error data Δϕ(3) corresponding to I and Q symbol-stream data I'(8) and Q'(8) out of the phase error table 14-1 while a symbol clock CLK$_{SYB}$ is not activated. A received-signal-phase rotation angle detecting circuit 8D is configured by replacing portions of the delay circuits 90 and 91 and phase-rotation-angle discriminating circuit 92 of the received-signal-phase rotation angle detecting circuit 8C in FIG. 7 with the delay circuits 90, 91, and 99 and the phase-rotation-angle discriminating circuit 92B in FIG. 5. A selector 16D inputs phase error data Δϕ(3) read out of the phase error table 14-1 to the delay circuit 90 while a symbol clock CLK$_{SYB}$ is not activated. Moreover, the selector 16D is able to detect a phase rotation angle against the transmission side viewed from the output side of the remapper 7 by the delay circuits 90, 91, and 99, the phase-rotation-angle discriminating circuit 92B, and the averaging circuit 95 in accordance with phase error data Δϕ(3) read out of the phase error table 14-1 for QPSK and sign bit data i'(1) and q'(1) of I and Q symbol-stream data I'(8) and Q'(8) similarly to the case of FIG. 5 and output received-signal-rotation-angle signal OR(3) against the transmission side viewed from the input side of the remapper 7 from the adder 110 by inputting the MSB of I symbol-stream data I'(8) output from the remapper 7 to the delay circuit 91 and the MSB of Q symbol-stream data Q'(8) output from the remapper 7 to the delay circuit 99.

Figure 9:
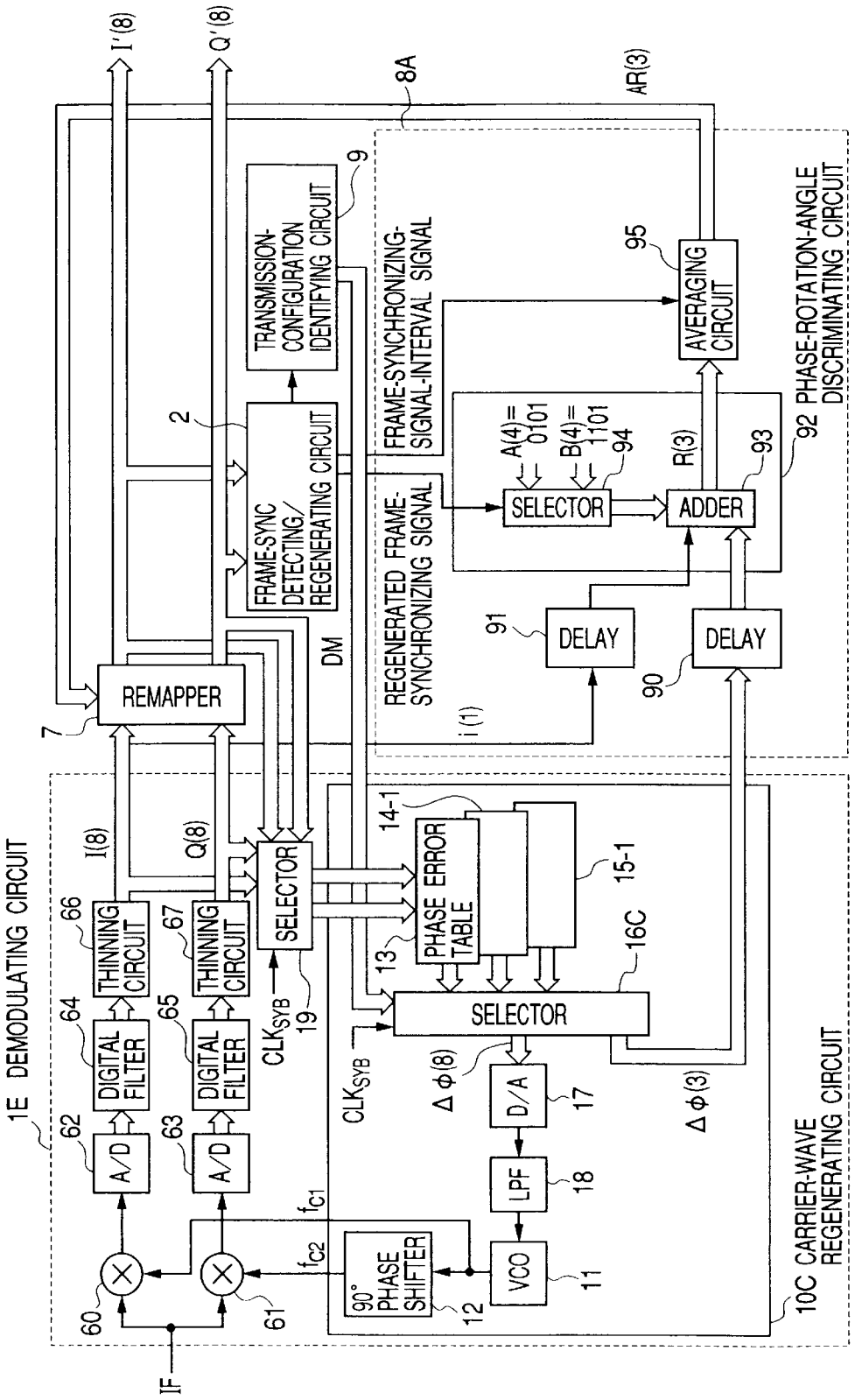
FIG. 9 is a block diagram showing a configuration of an essential portion of a wave to be PSK-modulated receiver of another modification in FIG. 7.

Moreover, the configuration in FIG. 7 can be modified to like that in FIG. 9. In FIG. 9, the received-signal-phase rotation angle detecting circuit 8C is replaced with the received-signal-phase rotation angle detecting circuit 8A in FIG. 1. Furthermore, the demodulating circuit 1C in FIG. 7 is modified to like a demodulating circuit 1E. A selector 19 is provided for the input side of I and Q symbol-stream data I'(8) and Q'(8) of each of phase error tables 13, 14-1, and 15-1 so as to input I and Q symbol-stream data I'(8) and Q'(8) to phase error tables 13, 14-1, and 15-1 output from remapper 7 while a symbol clock CLK$_{SYB}$ is activated and input I and Q symbol-stream data I(8) and Q(8) output from the demodulating circuit 1E to the phase error tables 13, 14-1, and 15-1 while the symbol clock CLK$_{SYB}$ is not activated.

Then, the selector 16C of the carrier-wave regenerating circuit 10C enables only the phase error table 13 for 8PSK while the symbol clock CLK$_{SYB}$ is activated before the transmission-configuration identifying circuit 9 identifies a multiple configuration of a frame and the received-signal-phase rotation angle detecting circuit 8A detects a received-signal-phase rotation angle after start of reception and reads out of the phase error table 13 phase error data Δϕ(8) corresponding to I and Q symbol-stream data I'(8) and Q'(8) input from the remapper 7 through the selector 19 while the symbol clock CLK$_{SYB}$ is activated to output the data Δϕ(8) to the D/A converter 17.

Moreover, at the same time as the above, the selector 16C enables only the phase error table 15-1 while the symbol clock CLK$_{SYB}$ is not activated and reads out of the phase error table 15-1 phase error data Δϕ(3) of high-order three bits in the phase error data Δϕ(8) corresponding to I and Q symbol-stream data I(8) and Q(8) input through the selector 19 while the symbol clock CLK$_{SYB}$ is not activated to output the data Δϕ(3) to the delay circuit 90.

Furthermore, after the transmission-configuration identifying circuit 9 identifies a multiple configuration of a frame and the received-signal-phase rotation angle detecting circuit 8A detects a received-signal-phase rotation angle Θ, the selector 16C enables only one phase error table corresponding to a modulation system of a received signal demodulated by the demodulating circuit 1E among the phase error tables 13, 14-1, and 15-1 while the symbol clock CLK$_{SYB}$ is activated and reads phase error,data Δϕ(8) corresponding to I and Q symbol-stream data I'(8) and Q'(8) input from the remapper 7 through the selector 19 while the symbol clock CLK$_{SYB}$ is activated to output the data Δϕ(8) to the D/A converter 17. Moreover, the selector 16C enables only the phase error table 15-1 for BPSK while the symbol clock CLK$_{SYB}$ is not activated so as to read out of the phase error table 15-1 phase error data Δϕ(3) of high-order three bits in the phase error data Δϕ(8) corresponding to I and Q symbol-stream data I(8) and Q(8) input through the selector 19 while the symbol clock CLK$_{SYB}$ is not activated. Thus, because a received-signal-phase rotation angle signal AR(3) against the transmission side viewed from the input side of the remapper 7 can be output from the averaging circuit 95 similarly to the case of FIG. 1, it is possible to omit the adder 110 and register 111 in FIG. 7.

Figure 10:
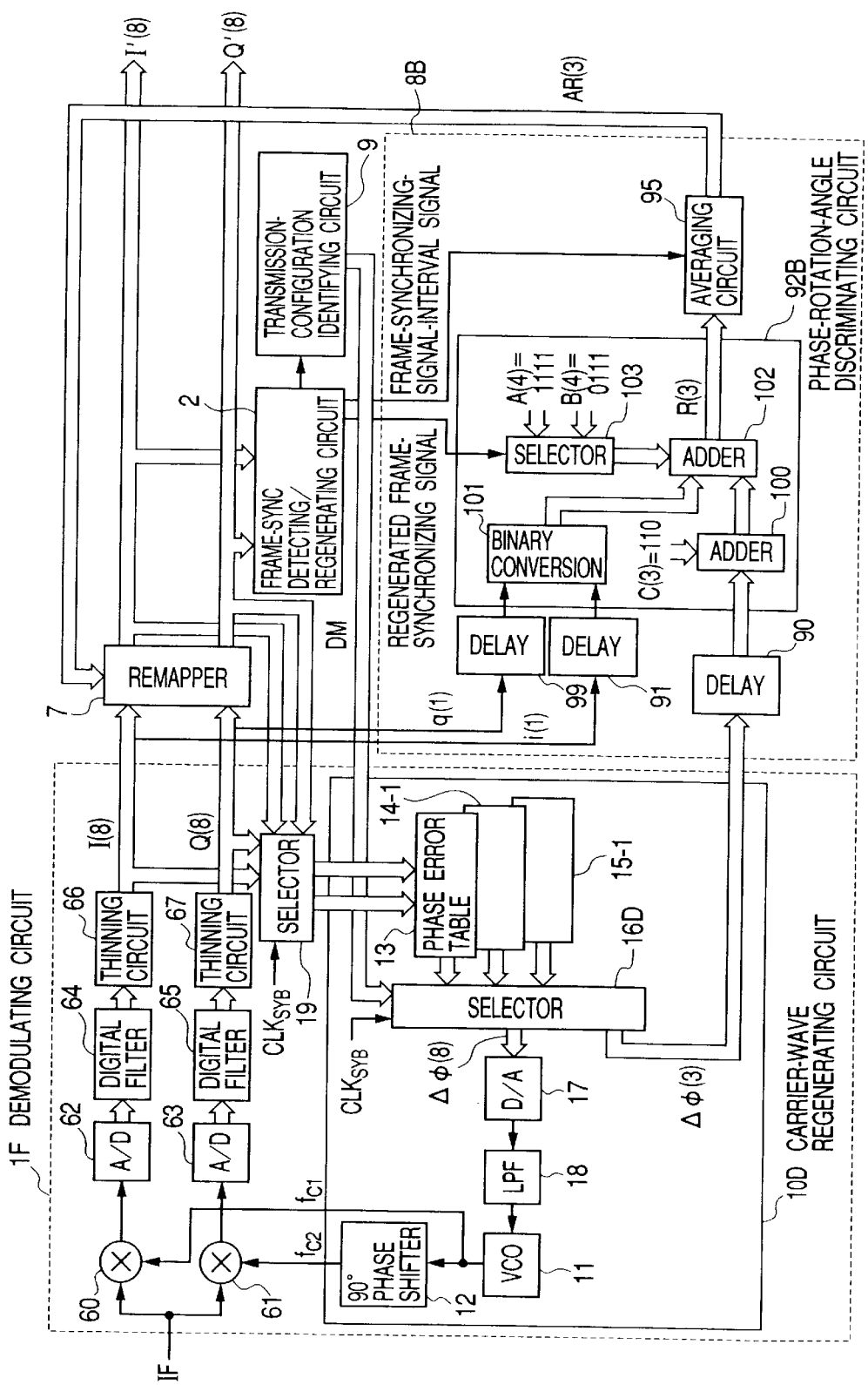
FIG. 10 is a block diagram showing a configuration of an essential portion of a wave to be PSK-modulated receiver of a modification in FIG. 8.

The configuration in FIG. 8 can be also modified to that in FIG. 10. In FIG. 10, the received-signal-phase rotation angle detecting circuit 8D in FIG. 8 is replaced with the received-signal-phase rotation angle detecting circuit 8B in FIG. 5. Moreover, the demodulating circuit 1D in FIG. 8 is modified to a demodulating circuit 1F. A selector 19 is provided for the input side of I and Q symbol-stream data I'(8) and Q'(8) of each of phase error tables 13, 14-1, and 15-1 so as to input I and Q symbol-stream data I'(8) and Q'(8) output from the remapper 7 to the phase error tables 13, 14-1, and 15-1 while a symbol clock CLK$_{SYB}$ is activated and input I and Q symbol-stream data I(8) and Q(8) output from the demodulating circuit 1F to the phase error tables 13, 14-1, and 15-1 while the symbol clock CLK$_{SYB}$ is not activated.

Moreover, a selector 16D of a carrier-wave regenerating circuit 10D enables only the phase error table 13 for 8PSK while the symbol clock CLK$_{SYB}$ is activated before the transmission-configuration identifying circuit 9 identifies a multiple configuration of a frame and the received-signal-phase rotation angle detecting circuit 8B detects a received-signal-phase rotation angle after start of reception and reads out of the phase error table 13 phase error data Δϕ(8) corresponding to I and Q symbol-stream data I'(8) and Q'(8) input from the remapper 7 through the selector 19 while the symbol clock CLK$_{SYB}$ is activated to output the data Δϕ(8) to the D/A converter 17.

Moreover, at the same time as the above, the selector 16D enables only the phase error table 14-1 for QPSK while the symbol clock CLK$_{SYB}$ is not activated and reads out of the phase error table 14-1 phase error data Δϕ(3) of high-order three bits in the phase error data Δϕ(8) corresponding to I and Q symbol-stream data I(8) and Q(8) input through the selector 19 while the symbol clock CLK$_{SYB}$ is not activated to output the data Δϕ(3) to the delay circuit 90.

After the transmission-configuration identifying circuit 9 identifies a multiple configuration of a frame and the received-signal-phase rotation angle detecting circuit 8B detects a received-signal-phase rotation angle Θ, the selector 16D enables only one phase error table corresponding to a modulation system of a received signal demodulated by the demodulating circuit 1F among the phase error tables 13, 14-1 and 15-1 while the symbol clock CLK$_{SYB}$ is activated and reads phase error data Δϕ(8) corresponding to I and Q symbol-stream data I'(8) and Q'(8) input from the remapper 7 through the selector 19 while the symbol clock CLK$_{SYB}$ is activated to output the data Δϕ(8) to the D/A converter 17.

Moreover, the selector 16D enables only the phase error table 14-1 for QPSK while the symbol clock $CLK_{SYB}$ is not activated so as to read out of the phase error table 14-1 phase error data $\Delta\phi(3)$ of high-order three bits in the phase error data $\Delta\phi(8)$ corresponding to I and Q symbol-stream data I(8) and Q(8) input through the selector 19 while the symbol clock $CLK_{SYB}$ is not activated. Thus, because a received-signal-phase rotation angle signal AR(3) against the transmission side viewed from the input side of the remapper 7 can be output from the averaging circuit 95 similarly to the case of FIG. 5, it is possible to omit the adder 110 and register 111 in FIG. 8.

In case of the above embodiments and their modifications, a multiple configuration is identified by a transmission-configuration identifying circuit after start of reception and a selector of a carrier-wave regenerating circuit outputs phase error data read out of a phase error table for 8PSK to a D/A converter before a received-signal-phase rotation angle is detected by a received-signal-phase rotation angle detecting circuit. However, it is also permitted to output a constant value showing phase error=zero instead.

Moreover, in the case of the above embodiments and their modifications, not only a BPSK-modulated frame-synchronizing signal but also a PSK-modulated signal (PSK-modulated wave) in which digital signals according to three modulation systems of 8PSK, QPSK, and BPSK are time-multiplexed are used. However, it is also possible to apply the embodiments and their modifications to a case of receiving and demodulating a signal to be PSK-modulated in which only a BPSK-modulated frame-synchronizing signal and 8PSK-modulated digital signal are time-multiplexed (it is enough to prepare a phase error table for 8PSK and a phase error table for BPSK) or a case of receiving and demodulating a signal to be PSK-modulated in which a BPSK-modulated frame-synchronizing signal, an 8PSK-modulated digital signal, and a QPSK-modulated digital signal are time-multiplexed.

Moreover, the embodiments and their modifications can be applied to a case in which a demodulating circuit performs a demodulating operation through semi-synchronous detection instead of performing a demodulating operation through synchronous detection.

INDUSTRIAL APPLICABILITY

According to the present invention, a received-signal-phase rotation angle is univocally determined by a high-order bit of phase error data according to a phase error table for BPSK (QPSK) modulation corresponding to demodulated I and Q symbol-stream data and sign bit data of I or Q (I and Q) symbol-stream data at a portion corresponding to bit (0) (or bit (1)) of a frame-synchronizing signal and it can be discriminated through a simple operation. Therefore, it is unnecessary to use a large ROM dedicated to discrimination of a phase rotation angle and it is possible to decrease a circuit size.

What is claimed is:

1. An apparatus for generating an absolute phase of a signal received by a receiver, said receiver comprising demodulating means for demodulating a signal to be PSK-modulated in which at least an 8PSK-modulated digital signal among an 8PSK-modulated digital signal, a QPSK-modulated digital signal, and a BPSK-modulated digital signal is time-multiplexed with a BPSK-modulated frame-synchronizing signal, by using carrier waves ($f_{c1}$ and $f_{c2}$) regenerated by carrier-wave regenerating means and outputting I and Q symbol-stream data (I(8) and Q(8)); frame-synchronizing-signal acquiring means (2) for acquiring a frame-synchronizing signal from the demodulated I and Q symbol-stream data; received-signal-phase rotation angle detecting means for detecting a phase rotation angle (R(3)) of I and Q symbol-stream data output from the demodulating means against the transmission side; and antiphase rotating means (7) for antiphase-rotating a phase of I and Q symbol-stream data output from the demodulating means by a phase rotation angle (R(3)) detected by the received-signal-phase rotation angle detecting means so that the carrier-wave regenerating means of the demodulating means has phase error tables (13, 14-1, and 15-1 to 15-4) storing carrier-wave phase error data ($\Delta\phi(8)$) for various demodulated I and Q symbol-stream data sets for each modulation system, reads phase error data corresponding to the demodulated I and Q symbol-stream data from a phase error table of a corresponding modulation system while the demodulating means demodulates a certain modulation-system portion upon normal reception, and corrects a phase of a carrier wave; wherein said apparatus is characterized in that said received-signal phase-rotation-angle detecting means (8A, 8B, 8C, or 8D) include phase-error-data reading means (16A, 16B, 16C, and 16D) for reading high-order bits ($\Delta\phi(3)$ and ($\Delta\phi'(3)$)) for judging whether the absolute value of a phase error is larger or smaller than $(\pi/8)+s\cdot(\pi/4)$ (s is 0 or 1) or $\pi/8$ among phase error data corresponding to the demodulated I and Q symbol-stream data from a phase error table (15-1 to 15-4 or 14-1, 14-2) for BPSK modulation of the carrier-wave regenerating means (10A, 10B, 10C or 10D) and discriminating means (92 or 92B) for discriminating a phase rotation angle of a symbol portion corresponding to bit (0) (or bit (1)) of a frame-synchronizing signal against the transmission side in I and Q symbol-stream data output from demodulating means (1A, 1B, 1C, 1D, 1E, or 1F) in accordance with the sign bit data (i(1) and i'(1)) of I (or Q) symbol-stream data of a portion corresponding to bit (0) (or bit (1)) of a frame-synchronizing signal acquired by the frame-synchronizing-signal acquiring means in demodulated I and Q symbol-stream data (I(8) or Q(8)) and phase error data ($\Delta\phi(8)$ or ($\Delta\phi'(8)$)) read by the phase error data reading means correspondingly to the portion and outputting a discrimination result (R(3)).

2. A receiver for receiving a signal to be PSK-modulated obtained by time-multiplexing a BPSK-modulated frame-synchronizing signal and a digital signal modulated by a predetermined modulation system, from a transmitter, said receiver comprising:

demodulating means for demodulating the signal to be PSK-modulated and generating I and Q symbol-stream data (I(8) and Q(8));

frame-synchronizing-signal acquiring means (2) for acquiring a frame-synchronizing signal from the I and Q symbol-stream data;

received-signal-phase rotation angle detecting means for detecting a phase difference between I and Q symbol-stream data to the transmitter side; and antiphase rotating means (7) for inversely-rotating a phase of I and Q symbol-stream data by a phase difference (R(3)) detected by the received-signal-phase rotation angle detecting means to generate I and Q symbol-stream data (I'(8) and Q'(8)) in which a transmitter-side phase angle coincides with a receiver-side phase angle so that said demodulating means includes carrier-wave regenerating means for regenerating a carrier wave used to perform demodulation, and said carrier-wave regenerating means has phase error tables (13, 14-1, and 15-1 to 15-4) for storing carrier-wave phase error data ($\phi(8)$) corresponding to I and Q symbol-stream data generated by the demodulating means and generates a carrier wave synchronizing with a carrier wave used for the transmitter side in accordance with the carrier-wave phase error data ($\Delta\phi(8)$), wherein said received-signal-phase rotation angle detecting means (8A, 8B, 8C, or 8D) detect the phase difference in accordance with at least either of parts ($\Delta\phi(3)$ or $\Delta\phi'(3)$) of the carrier-wave phase error data ($\Delta\phi(8)$ or $\Delta\phi'(8)$) and I and Q symbol-stream data and a frame-synchronizing signal acquired by the frame-synchronizing-signal acquiring means and supply the phase difference to the antiphase rotating means.

* * * * *